United States Patent
Durvasula et al.

(10) Patent No.: US 12,430,637 B2
(45) Date of Patent: Sep. 30, 2025

(54) DIGITAL WALLET APPLICATIONS SUPPORTING DECENTRALIZED WEB INTEGRATION

(71) Applicant: TEACHERS INSURANCE AND ANNUITY ASSOCIATION OF AMERICA, New York, NY (US)

(72) Inventors: Sastry Vsm Durvasula, Phoenix, AZ (US); Thasunda Brown Duckett, Greenwich, CT (US); Swatee Singh, Livingston, NJ (US); Rares Ioan Almasan, Paradise Valley, AZ (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 0 days.

(21) Appl. No.: 18/384,010

(22) Filed: Oct. 26, 2023

(65) Prior Publication Data
US 2024/0428229 A1    Dec. 26, 2024

Related U.S. Application Data

(60) Provisional application No. 63/522,197, filed on Jun. 21, 2023.

(51) Int. Cl.
*G06Q 20/00* (2012.01)
*G06N 20/00* (2019.01)
*G06Q 20/36* (2012.01)
*G06Q 20/40* (2012.01)

(52) U.S. Cl.
CPC .......... *G06Q 20/363* (2013.01); *G06N 20/00* (2019.01); *G06Q 20/40* (2013.01)

(58) Field of Classification Search
CPC ....... G06Q 20/363; G06Q 20/40; G06N 20/00
See application file for complete search history.

(56) References Cited

U.S. PATENT DOCUMENTS

2014/0339315 A1* 11/2014 Ko ........................ G06F 1/1628
                                                                      235/492

* cited by examiner

*Primary Examiner* — Jamara A Franklin
(74) *Attorney, Agent, or Firm* — MARSHALL, GERSTEIN & BORUN LLP; Randall G. Rueth

(57) ABSTRACT

Techniques for implementing digital wallet applications supporting decentralized web integration are disclosed herein. An exemplary system includes: one or more processors; and a non-transitory computer-readable memory coupled to the one or more processors. The memory stores instructions thereon that, when executed by the one or more processors, cause the one or more processors to: initialize a digital wallet application associated with a user, wherein the digital wallet application is integrated with at least one decentralized web technology and hosted on a digital wallet platform. The digital wallet application also implements a digital wallet linked to a set of electronic accounts. The instructions further cause the one or more processors to obtain data from a set of data sources; and generate, using at least one machine learning (ML) model based on the data, a recommendation for the user related to at least one electronic account of the set of electronic accounts.

20 Claims, 7 Drawing Sheets

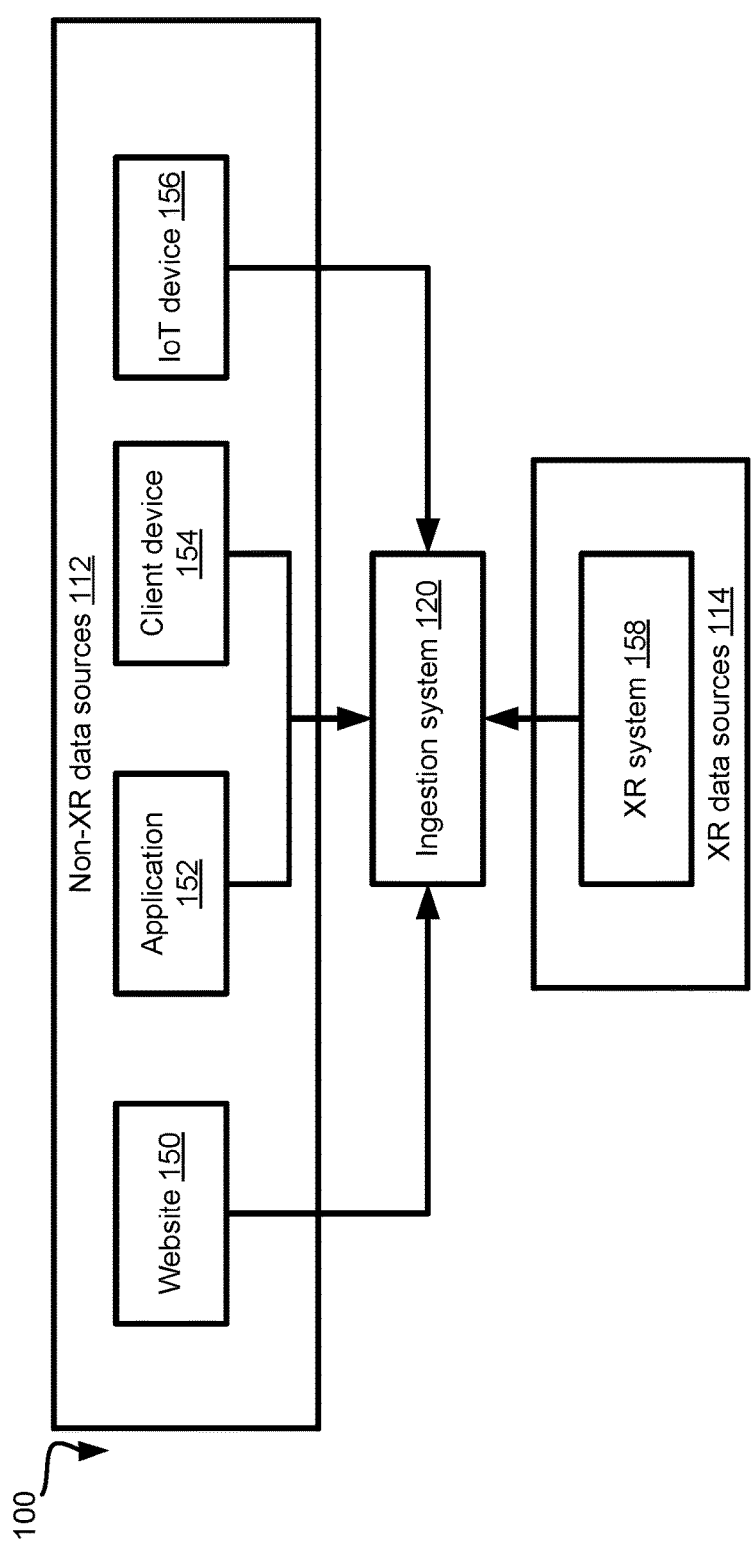
FIG. 1B
FIG. 1C

DIGITAL WALLET APPLICATIONS SUPPORTING DECENTRALIZED WEB INTEGRATION

CROSS-REFERENCE TO RELATED APPLICATIONS

This application claims priority to U.S. Provisional Application No. 63/522,197, entitled "Digital Wallet Applications Supporting Decentralized Web Integration," filed on Jun. 21, 2023, the disclosure of which is hereby incorporated herein by reference.

TECHNICAL FIELD

Implementations of the disclosure relate generally to database management, and more specifically, relate to digital wallet applications supporting decentralized web integration.

BACKGROUND

A digital wallet refers to an electronic account controlled (e.g., owned) by a user that enables the user to perform transactions, such as send, retrieve and/or store digital assets. Examples of digital assets include currency (e.g., cryptocurrency and/or non-cryptocurrency), non-fungible tokens (NFTs), etc. A digital wallet stores, for each digital asset, information regarding the location of the digital asset on the corresponding ledger. A digital wallet can be identified by the public key of a key pair. The public key defines an address for the digital wallet that others can use to send digital assets to the digital wallet. The private key of the key pair is used to digitally sign transactions. For example, when a transaction is initiated, the digital wallet software can create a digital signature by processing the transaction with the private key. Another entity can verify the digital signature to determine that a transaction was initiated from the digital wallet. For example, a digital wallet can be implemented using a hardware wallet. A hardware wallet is a special purpose computing device that executes software to support offline digital asset storage (i.e., cold storage). Access to digital assets via the hardware wallet is enabled via a private key after the external physical device is connected to a main computing device. As another example, a digital wallet can be implemented using a software wallet. A software wallet is an application running on a general purpose computing device (e.g., desktop, laptop or mobile device) that enables access to digital assets that are stored on a remote server (e.g., cloud server).

Such conventional digital wallets suffer from numerous drawbacks. Namely, conventional digital wallets lack flexibility to integrate multiple, disparate accounts or to provide user education regarding the services provided by any account linked through a digital wallet. As a result, conventional digital wallets lead to significant customer confusion, inefficient management of such disparate accounts, lack of cohesion between/among similar services, and an overall unsatisfactory user experience.

Accordingly, there is a need for digital wallet applications supporting decentralized web integration to resolve these, among others, issues with conventional techniques.

SUMMARY

In an embodiment, the present invention is a system comprising: one or more processors; and a non-transitory computer-readable memory coupled to the one or more processors, the memory storing instructions thereon that, when executed by the one or more processors, cause the one or more processors to: initialize a digital wallet application associated with a user, wherein the digital wallet application is integrated with at least one decentralized web technology and hosted on a digital wallet platform, and wherein the digital wallet application implements a digital wallet linked to a set of electronic accounts; obtain data from a set of data sources; and generate, using at least one machine learning (ML) model based on the data, a recommendation for the user related to at least one electronic account of the set of electronic accounts.

In a variation of this embodiment, the instructions, when executed by the one or more processors, further cause the one or more processors to: train the at least one ML model with a set of training data from the set of data sources to generate a set of training recommendations as outputs, wherein each training recommendation in the set of training recommendations is related to an electronic account of the set of electronic accounts.

In another variation of this embodiment, a first data source of the set of data sources is a campaign corresponding to a first electronic account of the set of electronic accounts, and wherein the instructions, when executed by the one or more processors, further cause the one or more processors to: verify that the first data source satisfies a security threshold; responsive to determining that the first data source fails to satisfy the security threshold, block data transmission from the first data source; responsive to determining that the first data source satisfies the security threshold, obtain a first data set from the first data source; and apply the at least one ML model to user post language and security compliance data from the first data set to generate the recommendation for the user.

In yet another variation of this embodiment, the instructions, when executed by the one or more processors, further cause the one or more processors to: receive user input corresponding to at least one electronic account; analyze, by the at least one ML model, the user input and a data set from one or more electronic accounts that are different from the at least one electronic account; generate, by the at least one ML model based on the user input, a subsequent recommendation indicating a predicted impact the user input has on the at least one electronic account of the one or more electronic accounts that are different from the at least one electronic account; and cause a user interface to display the subsequent recommendation for analysis by the user.

In still another variation of this embodiment, the instructions, when executed by the one or more processors, further cause the one or more processors to: aggregate security data from one or more data sources that are external to the digital wallet application, the aggregated security data being associated with one or more electronic accounts of the set of electronic accounts; update a set of security data that is stored as part of the digital wallet application based on the aggregated security data; generate, by the at least one ML model, (i) an interference prediction based on the data from the set of data sources and the updated set of security data and (ii) a security recommendation for the user based on the interference prediction, wherein the interference prediction indicates at least one of the one or more electronic accounts represented in the aggregated security data; and cause a user interface to display the interference prediction and the security recommendation for analysis by the user. Further in this variation, the instructions, when executed by the one or more processors, further cause the one or more processors to: receive, from the user, an input related to the security recommendation; and modify a security operation of the at least one of the one or more electronic accounts represented in the aggregated security data based on the user input.

In yet another variation of this embodiment, the instructions, when executed by the one or more processors, further cause the one or more processors to: aggregate security data from one or more data sources that are external to the digital wallet application, the aggregated security data being associated with one or more electronic accounts of the set of electronic accounts; update a set of security data that is stored as part of the digital wallet application based on the aggregated security data; generate, by the at least one ML model, a security recommendation for the user based on the updated set of security data, wherein the security recommendation indicates at least one of the one or more electronic accounts represented in the aggregated security data; cause a user interface to display the security recommendation for analysis by the user; receive, from the user, an input related to the security recommendation; and modify a security operation of the at least one of the one or more electronic accounts represented in the aggregated security data based on the user input.

In still another variation of this embodiment, the instructions, when executed by the one or more processors, further cause the one or more processors to: construct, by the at least one ML model based on historical user data stored as part of the digital wallet application, an action pattern of the user; generate, by the at least one ML model based on the action pattern, a set of predicted action patterns of the user; organize the set of predicted action patterns into a ranked list based on one or more criteria; and modify subsequent outputs of the digital wallet application in accordance with the ranked list.

In yet another variation of this embodiment, the instructions, when executed by the one or more processors, further cause the one or more processors to: construct, by the at least one ML model based on historical user data stored as part of the digital wallet application, an action pattern of the user; generate, by the at least one ML model based on the action pattern, (i) a short-term recommendation for the user, (ii) a medium-term recommendation for the user, and (iii) a long-term recommendation for the user, wherein each recommendation is associated with one or more of the set of electronic accounts; and modify subsequent outputs of the digital wallet application in accordance with the short-term recommendation, the medium-term recommendation, and the long-term recommendation.

In still another variation of this embodiment, the digital wallet is hosted on a distributed ledger platform with access to a distributed ledger and each transaction input by the user is recorded on the distributed ledger, and wherein the instructions, when executed by the one or more processors, further cause the one or more processors to: receive a transaction listing from the user corresponding to one or more of the set of electronic accounts, the transaction listing including (i) user data corresponding to the user and (ii) an updated state of an asset related to the one or more of the set of electronic accounts; generate a transaction including a description of the transaction listing; and record the transaction in the distributed ledger. Further in this variation, the instructions, when executed by the one or more processors, further cause the one or more processors to: responsive to recording the transaction in the distributed ledger, update a virtual, three-dimensional representation of the asset based on the updated state of the asset.

In yet another variation of this embodiment, the instructions, when executed by the one or more processors, further cause the one or more processors to: aggregate historical user data for one or more users accessing the digital wallet platform; construct, by the at least one ML model based on historical user data stored as part of the digital wallet application and the aggregated historical user data, a group action pattern of the user and other users indicated in the aggregated historical user data that are substantially similar to the user based on one or more similarity metrics; generate, by the at least one ML model based the group action pattern, the recommendation for the user; and modify subsequent outputs of the digital wallet application in accordance with the recommendation.

In still another variation of this embodiment, the instructions, when executed by the one or more processors, further cause the one or more processors to: generate, by the at least one ML model based on (i) a set of virtual assets of the user and (ii) a set of real assets of the user, an allocation recommendation; receive a user input from the user corresponding to the allocation recommendation; adjust an allocation of the set of virtual assets of the user or the set of real assets of the user based on the user input; and update the at least one ML model in accordance with the user input.

In another embodiment, the present invention is a method comprising: initializing, by one or more processors, a digital wallet application associated with a user, wherein the digital wallet application is integrated with at least one decentralized web technology, and wherein the digital wallet application implements a digital wallet linked to a set of electronic accounts; obtaining, by the one or more processors, data from a set of data sources; and generating, by the one or more processors using at least one machine learning (ML) model based on the data, a recommendation for the user related to at least one electronic account of the set of electronic accounts.

In a variation of this embodiment, the method further comprises: training, by the one or more processors, the at least one ML model with a set of training data from the set of data sources to generate a set of training recommendations as outputs, wherein each training recommendation in the set of training recommendations is related to an electronic account of the set of electronic accounts.

In another variation of this embodiment, a first data source of the set of data sources is a campaign corresponding to a first electronic account of the set of electronic accounts, and the method further comprises: verifying, by the one or more processors, that the first data source satisfies a security threshold; responsive to determining that the first data source fails to satisfy the security threshold, blocking, by the one or more processors, data transmission from the first data source; responsive to determining that the first data source satisfies the security threshold, obtaining, by the one or more processors, a first data set from the first data source; and applying, by the one or more processors, the at least one ML model to user post language and security compliance data from the first data set to generate the recommendation for the user.

In yet another variation of this embodiment, the method further comprises: aggregating, by the one or more processors, security data from one or more data sources that are external to the digital wallet application, the aggregated security data being associated with one or more electronic accounts of the set of electronic accounts; updating, by the one or more processors, a set of security data that is stored as part of the digital wallet application based on the aggregated security data; generating, by the at least one ML model, a security recommendation for the user based on the updated set of security data, wherein the security recommendation indicates at least one of the one or more electronic accounts represented in the aggregated security data; causing, by the one or more processors, a user interface to display the security recommendation for analysis by the user; receiving, from the user, an input related to the security recommendation; and modifying, by the one or more processors, a security operation of the at least one of the one or more electronic accounts represented in the aggregated security data based on the user input.

In still another variation of this embodiment, the method further comprises: constructing, by the at least one ML model based on historical user data stored as part of the digital wallet application, an action pattern of the user; generating, by the at least one ML model based on the action pattern, a set of predicted action patterns of the user; organizing, by the one or more processors, the set of predicted action patterns into a ranked list based on one or more criteria; and modifying, by the one or more processors, subsequent outputs of the digital wallet application in accordance with the ranked list.

In yet another variation of this embodiment, the digital wallet is hosted on a distributed ledger platform with access to a distributed ledger and each transaction input by the user is recorded on the distributed ledger, and the method further comprises: receiving, by the one or more processors, a transaction listing from the user corresponding to one or more of the set of electronic accounts, the transaction listing including (i) user data corresponding to the user and (ii) an updated state of an asset related to the one or more of the set of electronic accounts; generating, by the one or more processors, a transaction including a description of the transaction listing; and recording, by the one or more processors, the transaction in the distributed ledger.

In yet another embodiment, the present invention is a non-transitory computer-readable storage medium having instructions stored thereon that, when executed by one or more processors, cause the one or more processors to: initialize a digital wallet application associated with a user, wherein the digital wallet application is integrated with at least one decentralized web technology, and wherein the digital wallet application implements a digital wallet linked to a set of electronic accounts; obtain data from a set of data sources; and generate, using at least one machine learning (ML) model based on the data, a recommendation for the user related to at least one electronic account of the set of electronic accounts.

Therefore, in accordance with the above, and with the disclosure herein, the present disclosure includes improvements in computer functionality or in improvements to other technologies at least because the present disclosure describes that, e.g., digital wallets and linked electronic accounts, may be improved or enhanced with the disclosed techniques for implementing digital wallet applications supporting decentralized web integration. That is, the present disclosure describes improvements in the functioning of digital wallets and linked electronic accounts itself or "any other technology or technical field" (e.g., digital asset maintenance and database management) because the disclosed systems and methods improve and enhance the operation of digital wallets and linked electronic accounts by introducing a digital wallet application and platform that support decentralized web integration in a manner that is unachievable using conventional systems and methods. This improves over the prior art at least because such conventional systems were inefficient and lacked the account linking, predictive power, and educational capabilities of the techniques described in the present disclosure.

The systems and methods disclosed herein also leverage model(s) to generate and/or otherwise output data that may yield many of the advantages previously mentioned. These model(s) may be trained using machine learning and may utilize machine learning during operation. Therefore, in these instances, the techniques of the present disclosure may further include improvements in computer functionality or in improvements to other technologies at least because the disclosure describes such models being trained with a plurality of training data (e.g., 10,000s of training data, etc.) to output recommendations configured to improve a respective user's efforts related to a digital wallet and linked electronic accounts.

Moreover, the present disclosure includes effecting a transformation or reduction of a particular article to a different state or thing, e.g., transforming or reducing the management of a digital wallet and any linked electronic accounts from a non-optimal or error state to an optimal state.

Still further, the present disclosure includes specific features other than what is well-understood, routine, conventional activity in the field, or adding unconventional steps that demonstrate, in various embodiments, particular useful applications, e.g., initialize a digital wallet application associated with a user, wherein the digital wallet application is integrated with at least one decentralized web technology and hosted on a digital wallet platform, and wherein the digital wallet application implements a digital wallet linked to a set of electronic accounts; obtain data from a set of data sources; and/or generate, using at least one machine learning (ML) model based on the data, a recommendation for the user related to at least one electronic account of the set of electronic accounts, among others.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIGS. 1A-2 are diagrams of example computer systems to implement digital wallet applications supporting decentralized web integration, in accordance with some implementations of the present disclosure.

DETAILED DESCRIPTION

Figure 1A:
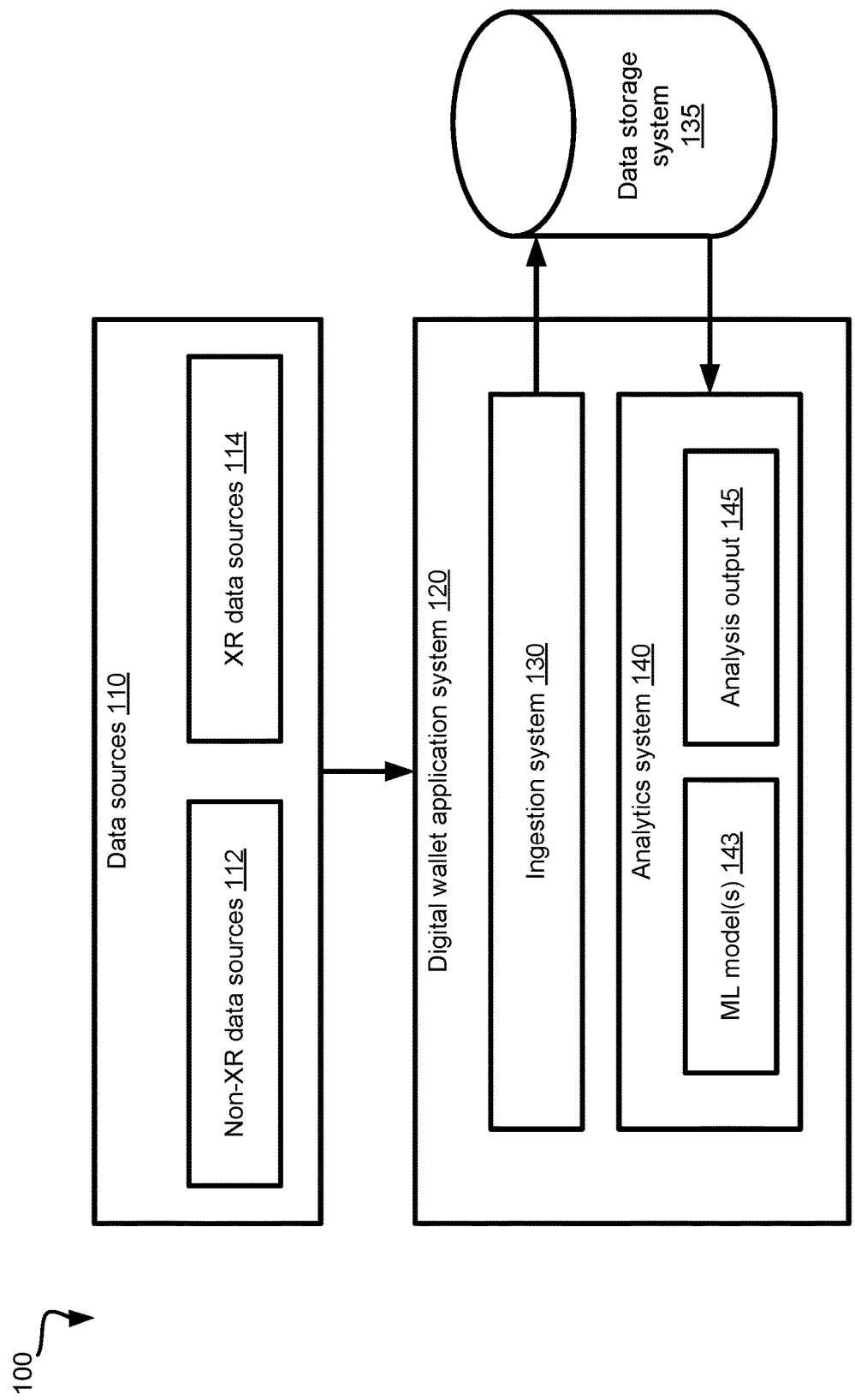

Aspects of the present disclosure are directed to digital wallet applications supporting decentralized web integration. For example, a digital wallet application described herein can be enabled as a software wallet. The decentralized web, also referred to as Web3 or Web 3.0, generally refers to a set of technologies (e.g., applications, platforms and/or protocols) that aim to create a more decentralized, democratic and open Internet that is less reliant on centralized platforms. In the decentralized web, users can have more control over their data and online interactions, and applications can be built on open standards and interoperable protocols. Accordingly, the decentralized web can promote further innovation and collaboration. Decentralized web technologies can allow for secure and transparent transactions without the need for intermediary entities. Examples of decentralized web technologies include distributed ledger (e.g., blockchain) technology, extended reality (XR) technology, etc. Decentralized web technologies can enable peer-to-peer (P2P) interactions and transactions, as well as the creation of decentralized applications (dApps) that are not controlled by a central authority. Decentralized web technologies can also include decentralized storage systems, such as the InterPlanetary File System (IPFS), which allows for the creation of a more resilient and censorship-resistant web, as well as identity and authentication systems that enable users to have more control over their digital identity.

A distributed ledger is a data structure including a chain of cryptographically linked blocks of data (e.g., blockchain), where each block of the ledger maintains a record of one or more completed transactions occurring within a distributed ledger network. A transaction generally reflects an update to data maintained by one or more accounts of the distributed ledger. One example of a transaction is a transfer of a digital asset from one entity to another. Another example of a transaction is an exchange of digital assets between entities. An exchange can involve two or more transfers between at least two entities, where each transfer is performed in a respective direction between a pair of entities. For example, an exchange between a first entity and a second entity can include a transfer of a number of units of a first digital asset from the first entity to the second entity, and a transfer of a number of units of a second digital asset from the second entity to the first entity. Yet another example of a transaction is publishing of data (e.g., sharing of medical data, object tracking, vote tracking). A block can include one or more transaction records and a cryptographic digest ("digest") of the previous block representing the previous batch of transactions. A digest can be generated by a one-way function that produces the same output data for a given input. A one-way function is a function that, from a computational complexity perspective, is "easy" to obtain an output for a given input, but "hard" to invert the output to identify the given input. For example, the digest can be a hash value, which is an output string of data generated by employing a hashing method to an input string of data. Although the input string can be arbitrarily large, the output hash value can be set to a fixed size in accordance with the hashing method used. Digests provide a secure way to maintain integrity of the ledger. For example, any attempted change of an earlier block will result in the modified digest of the block, which would require modifications to all subsequent blocks in the blockchain (i.e., tamper-proofing). A distributed ledger network can include a decentralized network of nodes (i.e., computing devices), each of which maintains a copy of the distributed ledger for tracking and managing transactions. The nodes are responsible for managing (e.g., verifying) the transactions before appending them to the distributed ledger. In other words, the network of nodes does not employ a centralized intermediary (e.g., exchange) for managing transactions. A consensus protocol is a decentralized process employed by the nodes for verifying a transaction before a corresponding block can be added to the ledger. For example, verifying the transaction can include determining whether a source account has enough balance to transfer the amount specified by the transaction. The consensus protocol can manage transaction verification by determining which node(s) are able to verify the transaction. For example, nodes can compete against each other to be the first to verify the transaction (e.g., "Proof of Work" consensus protocol). As another example, a single node can be selected to perform block validation (e.g., "Proof of Stake" consensus protocol).

In some implementations, a digital wallet is housed on a distributed ledger for integration into one or more decentralized web platforms. In some implementations, a digital wallet uses at least one smart contract to manage digital assets. For example, the at least one smart contract can manage digital asset transactions between the digital wallet and another digital wallet. A digital wallet can be used to maintain and manage a variety of digital assets, such as fungible tokens (e.g., digital coins or cryptocurrency), non-fungible tokens (NFTs), semi-fungible tokens (SFTs), etc. In some implementations, a digital wallet enables interaction with a set of decentralized finance (DeFi) protocols. For example, a digital wallet can provide rewards for digital asset staking and/or liquidity provision.

In some implementations, a digital wallet is integrated with an XR platform (e.g., as described herein in reference to FIG. 1B). For example, a digital wallet can be used to maintain and manage virtual assets associated with a virtual environment accessible via an XR platform. Examples of virtual assets include virtual land, virtual currency, digital collectibles, etc. A digital wallet can support virtual asset transactions within the virtual environment (e.g., buying, selling and/or trading or virtual assets).

In some implementations, a digital wallet functions as an interoperable digital wallet to enable transfers of digital assets across different platforms. For example, a digital wallet can enable transfers of digital assets between different blockchains (e.g., cross-chain transfers) and/or different digital platforms (e.g., XR platforms). By supporting multiple distributed ledgers and/or multiple digital platforms, a digital wallet can enable digital and/or virtual asset transfers to be conducted without the need for multiple digital wallets.

A digital wallet application described herein can be linked to at least one user. For example, each user can register with a corresponding username to access a digital wallet. In some implementations, a digital wallet application is accessible using a username and password combination. In some implementations, a digital wallet application is accessible using multi-factor authentication (MFA). For example, a digital wallet application can be accessible using a username, password, and at least one additional authentication source. Examples of additional authentication sources include email address confirmation, text message confirmation via a mobile device, authentication token (e.g., authentication application or hardware security key), biometric authentication, etc. In some implementations, a digital wallet application is accessible without a password. For example, upon a login attempt by a user using a username, a message can be sent via email to an email address associated with the user, a text message to a mobile device associated with the user, etc. Additionally or alternatively, a user can be prompted to utilize an authentication token.

A digital wallet application described herein can enable a user to maintain at least one internal (i.e., native) electronic account or application. Additionally, a digital wallet described herein can enable a user to link at least one external (i.e., third-party) electronic account or application. Examples of external electronic accounts or applications include financial accounts and applications, such as investment accounts, bank accounts, retirement accounts, credit card accounts, rewards or loyalty accounts, peer-to-peer (P2P) payment applications, cryptocurrency accounts, etc. A digital wallet application can enable a user to view account activity (e.g., financial information and transactions) within a dashboard or graphical user interface (GUI) (e.g., a dashboard). A digital wallet application can enable users to link their reward points from different loyalty programs, such as credit card reward programs, airline loyalty programs, and hotel loyalty programs, etc. Users would be able to see their rewards balance and redeem them directly from a digital wallet, making it easier to keep track of their rewards across multiple loyalty programs. A digital wallet application described herein can enable a user to perform a transaction with respect to a third party application (e.g., send to receive digital assets), such as other digital wallets and/or P2P payment applications, directly within the digital wallet application without having to access the other application.

For example, a digital wallet application can utilize a linking application that can enable a user to securely connect external electronic accounts or applications to the digital wallet application. For example, for an external electronic account or application, a user can provide login credentials, and the linking application can securely retrieve data for the external electronic account or application. The linking application can employ cybersecurity measures to protect the user's login credentials and authorize data retrieval related to the external account or application. For example, the linking application can use an industry-standard authorization protocol, such as Open Authorization (OAuth), to securely authenticate a user. When a user links an external account or application, the linking application can send the login credentials to a server associated with the external account or application to authenticate and authorize the connection. The linking application can receive, from the server, an access token that can be used to access external account or application data pertaining to the user. The linking application can use one or more application programming interfaces (APIs) to retrieve data for an external account or application that has API integration. For example, the linking application can use a unified API that supports various programming languages and provides endpoints for enabling external account or application linking. One example of an API is a RESTful API, where REST refers to Representational State Transfer. A RESTful API is stateless, meaning that each request received by a server from a client contains all necessary information for the server to process the request and the server does not maintain a state of the client. The linking application can implement additional security features, such as data encryption, data tokenization, MFA, etc. The linking application can process data into a unified or normalized data format for each external account or application. One example of a unified data format is JSON.

For external accounts or applications that do not support APIs, the linking application can use an alternative data retrieval method. For example, the linking application can utilize a web scraper to perform web scraping. Web scraping refers to a process of extracting data automatically using a program (e.g., script) to simulate how the user would interact with the external account or application to extract data. For example, the web scraper can send, to a server associated with the external account or application, a request information for a particular webpage. In response, the server can provide a webpage containing the requested information. The web scraper can parse the webpage to extract relevant data and store the extracted data in a suitable data format for use by the digital wallet application.

The linking application can update data for an external account or application. For example, the linking application can utilize a webhook to receive real-time or near real-time updates from an external account or application. A webhook is a method of changing the behavior of a webpage or application using a custom callback triggered in response to an event occurring on the webpage or the application. For example, the external account or application can provide a webhook endpoint (e.g., universal resource locator (URL)) that the linking application can send a POST request (e.g., HTTP POST request) to. The linking application can register the webhook endpoint with the external account or application by providing a set of parameters (e.g., the webhook endpoint). When a trigger event occurs with respect to the external account or application, the external account or application can send the POST request to the webhook endpoint. The linking application can receive the POST request and perform at least one action in response to receiving the POST request (e.g., update a database, notify the user, trigger a workflow).

A digital wallet application described herein can offer additional security features. For example, in addition to MFA, a digital wallet described herein can implement multi-signature ("multisig") technology. Multisig technology refers to technology that provides a security feature used to safeguard digital assets by requiring multiple parties to sign off on transactions before they can be executed. In a typical digital asset transaction, only one private key may be required to authorize and complete a transaction. However, in a multisig transaction, multiple users are required to sign off on the transaction using their respective private keys. For example, if a digital wallet is set up with a 2-of-3 multisig, it would require two out of three designated users to sign off on any transaction for it to be executed. Multisig technology can be used to add an extra layer of security by making it more difficult for hackers or attackers to steal digital assets as they would need access to multiple private keys. Multisig technology can be used to implement, e.g., digital wallets owned by multiple users (e.g., joint accounts). Accordingly, multisig technology can be used to prevent a single user having complete control over a digital wallet application, reducing the risk of theft or unauthorized access.

A digital wallet application described herein can implement privacy-enhancing features such as zero-knowledge proofs (ZKPs) and encryption methods to obfuscate transaction data, such as the amount of digital assets being sent or received, to prevent third parties from tracking user activity. Additionally, the digital wallet application can be implemented using distributed ledger technology to enhance privacy and security by eliminating the need for a centralized authority to manage the digital wallet application. ZKPs refer to cryptographic techniques that employ algorithms (e.g., elliptic curve based algorithms) that can be used to generate proofs that can be used to prove the validity of a statement or claim without revealing any additional information beyond the claim itself. A ZKP can allow a user to prove that the user knows a piece of information without revealing the information itself, or to verify a transaction with revealing the identity of the parties to the transaction. For example, suppose a user wants to prove that the user knows the password to access a digital wallet application. With a ZKP, the user could prove knowledge of the password to a verifier without revealing the password. Examples of ZKPs include interactive proofs, non-interactive proofs, proofs of knowledge (PoK) and proofs of possession (POP). An interactive ZKP is a type of ZKP where the user and verifier engage in an interactive process to prove the validity of a statement without revealing any additional information beyond the statement itself. In contrast to an interactive ZKP, a non-interactive ZKP is a type of ZKP where the user can prove the validity of a statement without engaging in an interactive process with a verifier. In a non-interactive ZKP, the user can generate a proof and send the proof to a verifier, who can then verify the proof without the need for any further interaction with the user. In a PoK or PoP ZKP, a user can generate a proof that demonstrates their knowledge or possession, respectively, of information (e.g., secrets) without revealing the information itself and can send the proof to a verifier to prove knowledge or possession of the information. For example, a user can sign a message using a Pok ZKP to prove that the user knows the private key associated with the public key used to sign the message without revealing the private key itself. As another example, in a PoP ZKP, a user can prove possession of a secret without revealing the secret. Examples of secrets can include email addresses, phone numbers, etc.

A digital wallet application described herein can include functionality to facilitate savings and/or retirement goals. For example, the digital wallet application can intelligently provide recommendations for savings and/or retirement goals using machine learning (ML) models. The ML models can use data gathered from the intelligent insight generator and the security threat detector (e.g., threat detection engine 143) to recommend actions for users to take based on detected factors of the experience and proactive insights and security. These factors can include the type of campaign that triggered the interaction, the user's history, preferences, and behavior, as well as the type of interaction, environment, and technology mobility. In some implementations, the digital wallet application can automatically perform a recommended action for a user. For example, the user can provide the digital wallet application to perform automatic actions. As another example, the digital wallet application can provide a recommended action to the user (e.g., as a prompt), and the user can cause the digital wallet application to perform the recommended action. In some embodiments, a ML model includes a neural network. A neural network can include an input layer and an output layer. A neural network can be a feedforward neural network (FNN) or a recurrent neural network (RNN). In some implementations, a neural network includes a set of hidden layers between the input layer and the output layer. For example, the neural network can be at least one of a deep neural network (DNN), a deep belief network (DBN), a recurrent neural network (RNN), a convolutional neural network (CNN), a transformer (e.g., generative pre-trained transformer (GPT)), etc.

In some implementations, a digital wallet application can provide support for campaigns related to an electronic account (e.g., a savings account and/or a retirement account). More specifically, a digital wallet application can use ML models to determine whether a campaign is relevant and/or useful for a user based on user data, such as user savings and/or retirement goals. The digital wallet application can use ML models to ensure that campaigns are legitimate and to customize them to user goals. The ML models can assess the importance of potentially sensitive campaign language for the user and ensure that compliance details are met. The ML models can analyze user data (e.g., user behavior) to predict how a campaign will impact their retirement and compare expected benefits with those of similar users or user cohorts. The digital wallet application can assess a campaign s benefits to a user, taking into account past campaigns and highlighting how this campaign may be better or supplement past efforts towards achieving a goal (e.g., successful retirement). In some implementations, the digital wallet application can further enable the user to participate in the campaign.

In some implementations, a digital wallet application uses APIs to trigger participation in a campaign when a user enters a designated location. For example, a digital wallet application installed on a mobile device (e.g., smartphone) of a user uses location services of the mobile device to identify a campaign in a geographic proximity to the user. As another example, a digital wallet application can use APIs to trigger participation in a campaign when a user enters a designated location in a virtual environment accessible via an XR system (e.g., a VR system).

In some implementations, a digital wallet application installed on a mobile device of a user uses short-range communication technology of the mobile device to identify a campaign in a geographic proximity to the user. Examples of short-range communication technology include radio frequency identification (RFID) technology (e.g., near-field communication (NFC) technology), Bluetooth technology, etc. For example, if a user enters a mall and approaches a retirement information kiosk within the mall that includes an RFID (e.g., NFC) tag, the digital wallet application can communicate with the RFID tag via the mobile device to identify a campaign. The digital wallet application can then use a ML model to determine whether the campaign identified from the RFID tag would be relevant and/or useful for the user.

In some implementations, a user scans a barcode that identifies a campaign. One example of a barcode is a Quick Response (QR) code. The digital wallet application can use a ML model to determine whether the campaign identified from the barcode would be relevant and/or useful for the user. For example, the digital wallet application can access the camera of a mobile device of the user in order to scan a barcode. To illustrate, assume that a user is a passenger in a vehicle driving on a highway and spots a banner with a barcode (e.g., QR code) that directs to a campaign promoting retirement information. The user can scan the barcode using the digital wallet application, the digital wallet application can use a ML model to determine whether the campaign is relevant and/or useful for the user.

In some implementations, a campaign is a social media campaign. More specifically, the digital wallet application can allow users to participate in social media campaigns. For example, a social media campaign can be accessed by scanning a barcode (e.g., QR code). The digital wallet application can use plug-and-play features to integrate with social media platforms, allowing users to seamlessly participate in social media campaigns without having to navigate through complicated processes.

In some implementations, a digital wallet application enables a user to participate in a partner program. Examples of partner programs include rewards programs, loyalty programs, and affiliate marketing programs. For example, the digital wallet application can use plug-and-play features to seamlessly integrate with a partner program to enable the user to, e.g., easily earn rewards and contribute to retirement accounts.

In some implementations, a digital wallet application includes a smart savings engine. For example, the smart savings engine can utilize ML models (e.g., a series of ensemble models) to classify, rank and/or predict user behavior changes, and recommend specific savings types and benefits based user characteristics. User characteristics can include, for example, retirement expectations, goals, cost of living, other known patterns (e.g., family features, community features, and location features), etc. User characteristics can also be derived from either historical user behavior and/or similar user behavior (e.g., user cohort behavior). The smart savings engine can also identify the most relevant and effective savings campaigns for a user. For example, the smart savings engine can classify campaigns, compare benefits between campaigns, and offer user suggestions and guidance on how to make more informed decisions.

In some implementations, a digital wallet application supports automatic contributions to various electronic accounts, such as checking, savings, brokerage and/or retirement accounts. For example, a digital wallet application can be integrated with tax-advantaged accounts. Examples of tax-advantaged accounts include as 401 (*k*) plan accounts (e.g., traditional, Roth, solo), 403 (*b*) plan accounts, 457 plan accounts, 529 plan accounts, thrift savings plan (TSP) accounts, individual retirement accounts (IRAs), etc. Examples of IRAs include traditional IRAs, Roth IRAs, self-directed IRAs, Simplified Employee Pension (SEP) IRAs, Savings Incentive Match Plan for Employees (SIMPLE) IRA, etc. For example, an employer can set up automatic contributions to an employer-sponsored account (e.g., 401 (*k*) plan account, 403 (*b*) plan account, 457 plan account, TSP account) through the digital wallet application. The amount of the automatic contribution can be determined based on a percentage of salary, a predefined amount, etc.

In some implementations, a digital wallet application includes at least one automatic contribution feature that enables automatic contributions to at least one electronic account (e.g., a native account). Such automatic contribution features can enable a user to make small contributions to at least one electronic account. For example, an automatic contribution feature can be a point of sale contribution feature that enables a certain amount of a purchase at the point of sale to be transferred to an electronic account (e.g., a percentage or fixed amount). As another example, an automatic contribution feature can be a "round-up" feature in which the digital wallet application analyzes purchasing activity with respect to at least one electronic account linked to the digital wallet application (e.g., credit card account or debit card account), rounds-up each purchase amount to a predefined amount, and automatically transfers an amount of money equal to the difference between the predefined amount and the purchase amount using a designated electronic account linked to the digital wallet application (e.g., a checking account). By default, the predefined amount can be the nearest dollar. For a purchase that is a whole dollar amount, the predefined amount can be one dollar (e.g., if a purchase is for $5.00, then the predefined amount can be $6.00). The predefined amount can be customized. The digital wallet application can provide real-time feedback, suggestions and/or guidance with respect to how the automatic contributions can impact retirement savings over time. For example, the digital wallet application can generate visualizations, such as graphs, charts, etc., which can be model projected growth of the electronic account over time.

In some implementations, a digital wallet application implements a gamification engine (e.g., gamification engine 145) to incentivize and reinforce contributions for a native electronic account (e.g., retirement account) or an external electronic account. In some implementations, the gamification engine implements a reward maximizer. For example, a rewards maximizer can utilize ML models to maximize rewards by providing users with better insights and improving user decision making. By comparing and assessing user income in both virtual and real currencies, the ML models can be used to generate predictions on which environment and currency the user should focus on to maximize their benefits in the short, medium, and long term. The rewards maximizer can also provide independent opportunities to maximize virtual currencies within a gamification environment. In some implementations, a gamification engine implements a smart environment selector. A smart environment selector can continuously gather relevant information from various electronic outlets using ML models, such as public portals, blogs, and news, to generate patterns. The patterns can be used to enhance the rewards maximizer and maximize rewards and expedite conversion from virtual to real currencies and vice versa. In some implementations, a gamification engine implements an asset diversifier. An asset diversifier can further enhance the gamification engine by analyzing existing market options, such as portfolios, contribution systems, banking and financial accounts, etc. and classifying and ranking them based on the benefit opportunities. The asset diversifier can recommend an optimal asset diversification based on user data, such as user features, expectations, and goals, as well as recommendations from similar users and/or user cohorts.

The gamification engine can support various different gamification platforms. A gamification platform can implement gamification techniques to incentivize contributions to an electronic account (e.g., retirement account or savings account), such as a native electronic account. A gamification platform can be integrated within various online communities, such as social media communities, XR communities, etc., allowing users to easily share their progress and achievements with others in these communities. A gamification platform can also provide users with personalized insights and recommendations on how to optimize their contributions and maximize rewards.

One example of a gamification platform is a virtual rewards program platform. A virtual rewards platform can enable a user with ways to earn virtual and tangible rewards, such as badges, levels, currency, etc., for making contributions to an electronic account (e.g., native electronic account). A virtual rewards program platform can also provide users with personalized insights and recommendations on how to maximize rewards. In some implementations, a virtual rewards program platform is implemented within an XR gamification platform. An XR gamification platform can help users plan and achieve their savings and/or retirement goals within XR communities using XR technology. Users would be able to create virtual retirement accounts and invest virtual currency in a variety of XR assets, such as virtual real estate, digital collectibles, etc. Users can earn virtual rewards for making contributions, diversifying their portfolios, and achieving their retirement goals. The XR retirement planning platform can also provide personalized insights and recommendations on how to optimize their retirement contributions and maximize their rewards in the XR community.

Another example of a gamification platform is a social investment game platform. The social investment game platform can teach users about saving and/or investing (e.g., retirement investing) and incentivize users to make contributions. For example, the social investment game platform can provide users with the ability to create virtual retirement accounts and invest virtual currency in a variety of retirement assets. Users can earn virtual rewards for making contributions, diversifying their portfolios, and achieving their goals (e.g., retirement goals). The social investment game platform can also enable users to compete and collaborate with others.

A digital wallet application described herein can provide personalized recommendations to a user, such as a personalized recommendation regarding saving digital assets and/or retirement. The digital wallet application can generate personalized behavior patterns based on the users priorities and goals. These patterns can be classified and used to track, expose, and provide guidance on retirement opportunities and improvements. The digital wallet application can compare these patterns with similar users or groups for better decision-making and suggestions for next best actions.

To provide personalized recommendations to a user, the digital wallet application can analyze ingested data, which can include data obtained from XR and/or non-XR data sources, to generate a personalized recommendation for a user. In some implementations, the data is analyzed in real time or near real-time. More specifically, the analytics system can leverage a set of ML models that are trained to generate the personalized recommendation for the user using the ingested data. For example, the set of ML models can include at least one ML model trained by associating input training data representing data for respective users (e.g., combinations of health and wellness data, financial data, demographic data, and miscellaneous data), to respective output recommendations determined to be optimal for the input training data. Thus, the set of ML models can be trained to generate, for input data representative of a user, a recommendation that is predicted to be optimal for the user for the input data. In some implementations, analyzing the ingested data includes performing predictive modeling based on the ingested data. Predictive modeling refers to the use of a ML model to make predictions about future events or trends based on input data. The ML model can be trained using a training dataset including historical data (e.g., labeled data and/or unlabeled data), with the goal of teaching the ML model to identify relationships between input data and output data corresponding to future events or trends. In some implementations, analyzing the ingested data includes using a ML model including a neural network. For example, the neural network can be at least one of a DNN, a DBN, an RNN, a CNN, a transformer (e.g., GPT), etc.

In some implementations, a personalized recommendation generated for a user is a personalized plan for the user related to achieving a goal or target. For example, generating the personalized recommendation for the user can include identifying a set of factors from the ingested data that impact a plan for the user, and providing a personalized plan for the user with respect to the set of factors. Illustratively, the personalized plan can be a personalized retirement plan. In some implementations, a personalized retirement plan includes a lifetime income management plan. For example, generating a personalized retirement plan for a user can include identifying a set of factors that impact retirement planning for the user, and providing a personalized retirement plan with respect to the set of factors. Examples of factors that impact retirement planning can include income, expenses, savings rates, investment performance, investment allocation, retirement plan contributions, retirement account balances, entitlement benefits (e.g., Social Security and/or defined benefit plan), investment returns, healthcare costs, withdrawal strategies, tax rates, etc. As will be described in further detail herein below, the personalized retirement plan can be generated for a user during an accumulation phase to optimize resource accumulation prior to retirement, or a decumulation phase to optimize resource consumption during retirement. The term "accumulation phase" refers to the period in which the user is saving assets for retirement (e.g., a pre-retirement period). The term "decumulation phase" refers to the period in which the user is withdrawing assets during retirement (e.g., a post-retirement period). In some implementations, the digital wallet application includes a scenario planning engine that enables a user to explore various personalized plan scenarios. For example, in the context of personalized retirement plans, the recommendation system can provide a user with various retirement plan scenarios by modifying various factors, such as investment strategies, retirement account contributions, and withdrawal strategies. The retirement plan scenarios can show how modifying various factors can impact retirement savings, income streams, expenses, etc. over time.

In some implementations, a digital wallet application supports the use of a digital assistant that can interact with a user to perform tasks. For example, a digital assistant can be a conversation artificial intelligence (AI) platform (e.g., chatbot) that can receive a prompt via a user interface, and generate a command from the content of the prompt to use a ML model (e.g., generative AI model) trained to generate an output based on stored data obtained from the multiple components/products within the computing system. For example, the conversional AI platform can utilize speech-to-text (STT) and/or text-to-speech (TTS). In some implementations, an ML model is a language model. A language model can be trained on a corpus of text to generate human-like responses. For example, a language model can be a large language model (LLM) that can be trained on a large corpus of text. In some implementations, the ML model is a generative pre-trained transformer (GPT) model. For example, the prompt can be a voice prompt that is converted into a command to use an ML model (e.g., using natural language processing (NLP)). As another example, the prompt can be a text prompt that is converted into a command to use an ML model (e.g., using NLP). The conversational AI platform can graphically interface via an interactive digital avatar displayed via a user interface. For example, the output can be a result displayed via a user interface. NLP refers to techniques that can enable computers to understand and/or generate human-interpretable language. NLP techniques generally involve text preprocessing to transform raw text data into processed text data having a data format suitable for analysis, language understanding for identifying meaning and intent from the processed text data, and/or language generation for generating natural language text from non-language data, such as data from sensors, databases, etc. Text preprocessing can include at least one of tokenization, part-of-speech tagging, named entity recognition, etc. Language understanding can include at least one of parsing, sentiment analysis, semantic reasoning, topic modeling, text classification, etc. Language generation can include at least one of text summarization, machine translation, etc.

As described above, a digital wallet application can help users save (e.g., for retirement) by providing a secure, linked, and intelligent platform for small contributions. A digital wallet application can include advanced security features that meet or exceed privacy regulations and can easily be linked to other digital wallets and financial accounts via APIs and other technologies. AI-powered personalized insights and recommendations provide participants with educated contributions, while gamification incentivizes and reinforces retirement contributions in social media and XR communities. A digital wallet application can utilize AI/ML models to generate personalized behavior patterns and provide predictive and prescriptive engines that highlight short, medium, and long-term retirement savings opportunities. A digital wallet application can be integrated into blockchain, XR, and other decentralized web platforms, providing additional flexibility and accessibility. A digital wallet application can also have an intuitive conversational interface and visualizations, as well as secure-by-default features such as 2FA, multi-sig technology, and privacy-enhancing features like ZKPs and encryption methods. A digital wallet application can include a round-up savings feature and can be integrated with an employer-sponsored retirement plan. A digital wallet can be linked with various digital wallets and financial accounts via APIs like card payments, investment accounts, reward points, P2P payment applications, money transfer accounts, etc.

Figure 2:
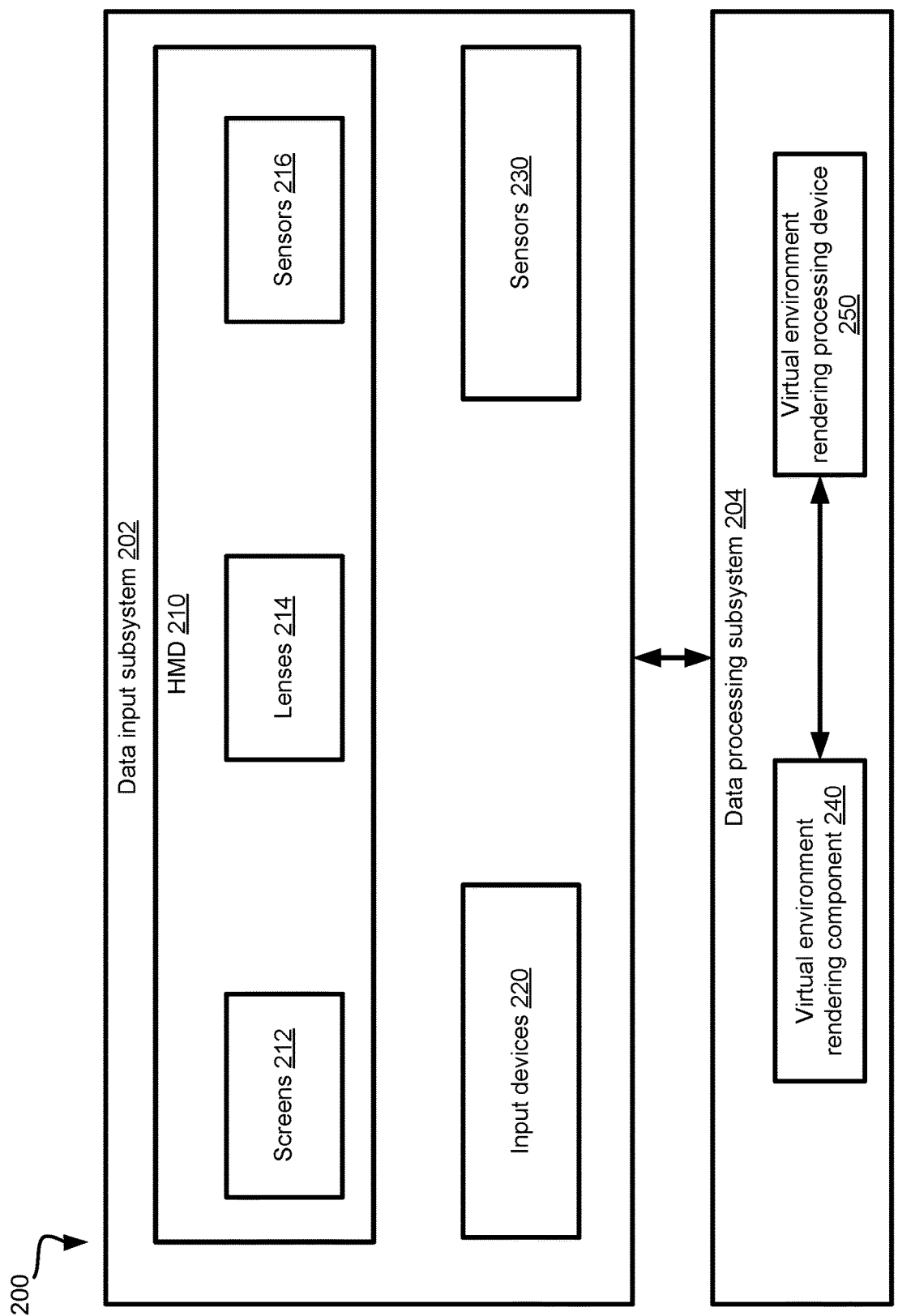

Turning now to the figures, FIGS. 1A-2 are diagrams of example computer systems 100, 140, 200 that may be configured to implement, host, and/or otherwise operate digital wallet applications/platforms supporting decentralized web integration, in accordance with some implementations of the present disclosure. The example computer system 100 of FIG. 1A includes a set of data sources 110, a digital wallet application system 120, and a data storage system 135. The digital wallet application system 120 may further include an ingestion system 130 and an analytics system 140, which itself includes and/or otherwise stores ML model(s) 143 and any analysis output(s) 145. The set of data sources 110 may also include a set of Non-XR data sources 112 and a set of XR data sources 114, as described herein.

Each of these components may transmit/receive information bi-directionally to facilitate real-time and/or otherwise updating of the various data, applications, etc. stored therein. For example, the digital wallet application system 120 may pull and/or receive data from the set of data sources 110, which may include data pulled/received from Non-XR data sources 112 and/or from XR data sources 114. The digital wallet application system 120 may pull/receive this data through the ingestion system 130 and may subsequently analyze the ingested data using the analytics system 140. More specifically, the digital wallet application system 120 may receive data from the set of data sources 110 and analyze that data using the ML model(s) 143 to generate a recommendation for a user related to at least one electronic account of the user's set of electronic accounts. This recommendation may be output as an analysis output 145 and/or may be pushed to the data storage system 135 for longer-term storage. Thereafter, the recommendation may be used to update/re-train one or more of the ML model(s) 143 stored as part of the analytics system 140.

As described herein, the recommendation may also be pushed, displayed, and/or otherwise provided to the respective user for their analysis. For example, a user may provide a user input user input corresponding to at least one electronic account, and the digital wallet application system 120 may receive this input as Non-XR data from a Non-XR data source 112. The digital wallet application system 120 may ingest this user input through the ingestion system 130 and analyze the user input using one or more ML model(s) 143 as part of the analytics system 140. The ML model(s) 143 may analyze the user input to generate a recommendation indicating, for example, a predicted impact the user input has on at least one electronic account, as described herein. Additionally, the digital wallet application system 120 may transmit the recommendation (e.g., as an analysis output 145) to a user device and/or otherwise cause a user interface to display the recommendation for analysis by the user. Upon receiving the recommendation, the user may view the recommendation and may take subsequent actions that the digital wallet application system 120 may ingest, analyze, and provide subsequent recommendations.

In any event, to provide additional clarity regarding the data ingestion process through the ingestion system 130, FIG. 1B provides a more detailed illustration of the components that may communicate data to the ingestion system 130 of the example computer system 100. The Non-XR data sources 112 may include a website 150, an application 152, a client device 154, an Internet of Things (IoT) device 156, and/or any other suitable data sources or combinations thereof. The XR data sources 114 may include an XR system 158, as described herein.

Any of these data sources may transmit data to the ingestion system 130 for ingestion into the digital wallet application system 120 of FIG. 1A. For example, the ingestion system 130 may receive and/or aggregate security data from a website 150 corresponding to an electronic account of a user. The ingestion system 130 may thereafter transmit or otherwise cause a set of security data stored in, for example, the digital wallet application system 120 and/or the data storage system 135 to update based on the aggregated security data. The ingestion system 130 may also forward the set of security data to the analytics system 140, where the ML model(s) 143 may generate (i) an interference prediction based on the data from the set of data sources and the updated set of security data, (ii) a security recommendation for the user based on the interference prediction and/or the updated set of security data, and/or any other suitable recommendation or combinations thereof.

As another example, the client device 154 may transmit data to the ingestion system 130 for ingestion into the digital wallet application system 120 of FIG. 1A. For example, a user may input information concerning a contribution to a retirement savings account into the client device 154. The client device 154 may forward and/or otherwise transmit that information to the ingestion system 130, which may transmit or otherwise cause a set of data corresponding to the user's retirement savings account linked to the digital wallet application system 120 to update based on the information concerning the user's contribution. The ingestion system 130 may also forward the information to the analytics system 140, where the ML model(s) 143 may generate a recommendation indicating a predicted impact the information concerning the user's contribution has on the user's linked retirement account and/or any of the other accounts linked through the digital wallet application system 120 that are different from the user's retirement savings account.

For example, the recommendation may indicate to the user that the user's contribution is insufficient to reach the user's retirement savings goal by the user's target/specified retirement date. The recommendation may further indicate that the user should increase their periodic contributions by X percentage/dollar amount to reach their retirement savings goals by their target/specified retirement date. Additionally, or alternatively, the recommendation may indicate that the user's periodic contributions may lead to the user reaching a yearly contribution limit for the user's linked retirement savings account (e.g., 401k) before the end of the year. In this circumstance, the recommendation may include informing the user that the user may receive additional funds from their employer during those remaining pay periods of the year, and that those funds may be ideally placed in the user's linked brokerage account through the digital wallet application system 120 for investment to maximize longer-term yields. Of course, the recommendation may include any suitable recommendations, information, and/or combinations thereof.

As yet another example, the XR system 158 may transmit data to the ingestion system 130 for ingestion into the digital wallet application system 120 of FIG. 1A. For example, the digital wallet application system 120 may be hosted on and/or otherwise have access to a distributed ledger platform that has access to the distributed ledger, and the XR system 158 may be or include the distributed ledger platform. Each transaction input by the user may be recorded on the distributed ledger, and the one or more processors executing the digital wallet application system 120 may receive the transaction listing(s) posted and/or otherwise input by the user corresponding to the distributed ledger through the ingestion system 130. Exemplary transaction listings may include user data corresponding to the user, an updated state of an asset related to any electronic account accessed by and/or linked to the digital wallet application system 120, and/or any other suitable information or combinations thereof.

In some embodiments, the user may provide information to the ingestion system 130, and the analytics system 140 may generate a transaction including a description of the transaction listing, and the analytics system 140 may record the transaction in the distributed ledger. Further in these embodiments, and responsive to recording the transaction in the distributed ledger, the analytics system 140 may output instructions causing the one or more processors executing the digital wallet application system 120 to update a virtual, three-dimensional (3D) representation of the asset based on the updated state of the asset indicated in the transaction, as stored in a virtual, 3D platform (e.g., Metaverse). Any such updates to virtual assets may also be transmitted from the relevant virtual platform, as part of the XR system(s) 158, to the ingestion system 130 for updating stored information (e.g., stored in the data storage system 135), generating recommendations and/or classifications (e.g., via the analytics system 140), and/or otherwise processing the information through the digital wallet application system 120, as described herein.

FIG. 1C illustrates several of the components that may analyze data provided to the analytics system 140 through the ingestion system 130 of the example computer system 100. Namely, FIG. 1C depicts an electronic account linking engine 141, a digital campaign engine 142, a threat detection engine 143, a digital wallet (DW) integration engine 144, and a gamification engine 145.

The electronic account linking engine 141 may generally connect each of a user's accounts with various campaigns that the user may engage with. For example, a user may drive on a highway and view a banner with a QR code promoting retirement information. The user may then scan the QR code (e.g., using the client device 154 of FIG. 1B), and the user may thereby initiate engagement with the campaign linked to the QR code through the electronic account linking engine 141. As another example, a user may enter a mall and approach a retirement information booth. In this example, the electronic account linking engine 141 may detect the use of, e.g., NFC, Bluetooth, and/or other technologies to initiate participation. In the metaverse and/or other virtual platforms linked to the digital wallet application system 120, the electronic account linking engine 141 may utilize APIs to trigger participation when a user enters a designated location within the virtual platform.

When the campaigns are linked to the user's digital wallet through the electronic account linking engine 141, the digital campaign engine 142 may generally enable users to perform actions that constitute participation in the campaigns. The digital campaign engine 142 may use plug-and-play and/or other features to seamlessly integrate with social media platforms and/or other external platforms hosting campaigns, thereby allowing users to easily participate in the campaigns, make contributions to linked accounts, and/or other suitable functionality without having to navigate through complicated processes. For example, the digital campaign engine 142 may enable a user to participate in campaigns by seamlessly integrating with partner programs, such as rewards programs, loyalty programs, and affiliate marketing programs that enable users to earn rewards and contribute to linked accounts through the digital wallet application system 120. The digital campaign engine 142 may also provide real-time feedback and intelligent scenarios indicating how the contributions and/or other participation is/are impacting the user's linked accounts (e.g., retirement savings account) and/or the rewards earned through any partner programs.

The threat detection engine 144 may generally leverage algorithmic and AI driven insights to continuously search the web and/or other suitable information sources (e.g., Non-XR data sources 112, XR data sources 114) for information related to regulations, policies, risks, compliance, and/or any other suitable data or combinations thereof to ensure that the security data stored as part of the digital wallet application system 120 is up-to-date. The threat detection engine 144 may also ensure that the retrieved information is continuously integrated and updated to the digital wallet application system 120. The threat detection engine 144 may also utilize AI and ML models to detect and predict any potential interference that a specific campaign may have with user security, compliance, and/or benefits. As a result, the threat detection engine 144 may provide continuous guidance on security, threat, and cybersecurity technologies that are utilized, accessed, and/or otherwise leveraged as part of the digital wallet application system 120. As described herein, the threat detection engine 144 may also incorporate two-factor authentication, multi-signature technology, zero-knowledge proofs, decentralized protocols, blockchain, and/or any other suitable privacy/security protocols to continuously enhance privacy while mitigating security threats to user accounts linked to the digital wallet application system 120.

The DW integration engine 146 may generally ensure that the capabilities of the digital wallet application system 120 are seamlessly integrated into any linked platform by providing all necessary features. For example, the DW integration engine 146 may enable the digital wallet application system 120 to permit/write/script/mint smart contracts, digital assets, cryptocurrencies, NFTs, decentralized finance, blockchain, etc. Similarly, the DW integration engine 146 may enable users to easily move their experiences from the real world into the virtual world, and vice versa, by leveraging established features to support Metaverse Web3, AR, VR, and/or any other suitable technologies/platforms in the virtual and real space. The DW integration engine 146 may also ensure that technologies required to connect multi-blockchain, multi-digital wallet, and/or multi-environment seamlessly are available to integrate with each other and can scale from one environment to another with ease.

The DW integration engine 146 may also receive continuous, intelligent solutions from the intelligent insights generator 3000. As described herein, the intelligent insights generator 3000 may utilize AI and ML technology to generate predictions, rankings, and/or classifications of these connected/linked technologies. The intelligent insights generator 3000 may generate/output recommendations to enhance the security and/or user experience, which the DW integration engine 146 may analyze to enhance secure integration of software and/or platforms into the digital wallet application system 120.

The gamification engine 147 may generally enhance, incentivize, and/or otherwise improve the user experience. The gamification engine 147 may utilize AI and ML technologies to provide users with improved insights and recommendations to make better decisions regarding the linked electronic accounts and/or platforms of the digital wallet application system 120 than was possible using conventional techniques. For example, the gamification engine 147 may compare and assess the user's income types in both virtual and real currencies and may utilize specific AI/ML models configured to generate predictions regarding which environment and currency the user should utilize to maximize their benefits in the short, medium, and/or long term. The gamification engine 147 may also provide independent opportunities for users to maximize virtual currencies within a gamified environment. Additionally, the gamification engine 147 may continuously and/or periodically gather relevant information from various public portals, blogs, and/or news sources using AI and ML models. These AM/ML models may then generate patterns that enhance the gamification engine 147 by better configuring the gamification engine 147 to maximize rewards, expedite conversion from virtual to real currencies and vice versa, and/or otherwise improve the user experience through gamification. The gamification engine 147 may also analyze all existing market options, such as portfolios, contribution systems, banking and financial accounts, etc. and classify and rank these options based on the benefit opportunities presented to the user. Based on the user s features, expectations, goals, recommendations from similar participants and groups, and/or other suitable information gathered, generated, and/or otherwise accessed by the gamification engine 147, the gamification engine 147 may recommend an optimal option for the user.

FIG. 2 illustrates an exemplary computing system 200 that may connect to and/or otherwise provide data/outputs to, from, and/or as part of the example computer system 100 of FIG. 1A. The exemplary computing system 200 may include a data input subsystem 202 and a data processing subsystem 204. The data input subsystem 202 may generally include a head mounted device (HMD) 210, various input devices 220, and various sensors 230. The data processing subsystem 204 may include a virtual environment rendering component 240 and a virtual environment rendering processing device 250.

The HMD 210 may generally be or include any device that a user may mount on their head to access any accounts and/or platforms linked to the digital wallet application system 120, such as VR and/or AR platforms. The HMD 210 may include one or more screens 212, one or more lenses 214, and one or more sensors 216. Each of these components 212, 214, 216 may enable the user to, for example, mount the HMD 210 on the user's head and view virtual environments, such as the Metaverse to engage with virtual stores, conduct virtual transactions, make real-world transactions with non-virtual accounts, and/or otherwise view and perform actions associated with accounts/platforms linked to the digital wallet application system 120. An example transaction may include the user mounting the HMD 210 on the user's head, accessing the Metaverse, engaging with a campaign hosted in the Metaverse, and purchasing virtual currency in the Metaverse as a result of the campaign. These virtual currency purchases may be uploaded, processed, and/or otherwise indicated in the digital wallet application system 120 and the user may utilize one or more input devices 220 (e.g., controllers, peripherals, etc.) in tandem with the HMD 210 to verify, validate, accept, and/or otherwise engage with these purchases and/or other transactions.

The user may also utilize the various sensors 216 included as part of the HMD 210 and/or the sensors 230 that are external to the HMD 210 to register the user's actions when engaging with accounts/platforms linked to the digital wallet application system 120. For example, the HMD 210 may include various sensors 216 (e.g., gyrometers, accelerometers, interial motion units (IMUs)) that track the user's orientation, movements, etc. that enable the user to move through virtual environments (e.g., in the Metaverse). The sensors 230 may also be or include such motion sensors (e.g., gyrometers, accelerometers, IMUs), and may include any other suitable sensors (e.g., visual sensors, audio sensors) that track and/or otherwise sense a user's and/or other entity movements that may impact transactions or other actions performed corresponding to accounts/platforms linked to the digital wallet application system 120.

The virtual environment rendering component 240 may generally be or include instructions that, when executed, are configured to cause the one or more processors of the digital wallet application system 120 to render virtual environments that a user may interact with when performing actions associated with virtual currency and/or other virtual accounts linked through the digital wallet application system 120. The virtual environment rendering processing device 250 may process the data generated through the user's interactions with the virtual environments rendered by the virtual environment rendering component 240.

For example, the user may mount the HMD 210 on the user's head, access the Metaverse, and engage with a campaign hosted in the Metaverse by purchasing virtual currency in the Metaverse as a result of the campaign. The virtual environment rendering component 240 may render the Metaverse to enable the user to access the Metaverse and engage with the campaign. The virtual environment rendering processing device 250 may process the data from the Metaverse of the user engaging with the campaign to enable the user to purchase the virtual currency.

Of course, it should be understood that the data input subsystem 202 may be or include any suitable data input devices and/or sources, and the data processing subsystem 204 may be or include any suitable data processing devices and/or components.

Figure 3:
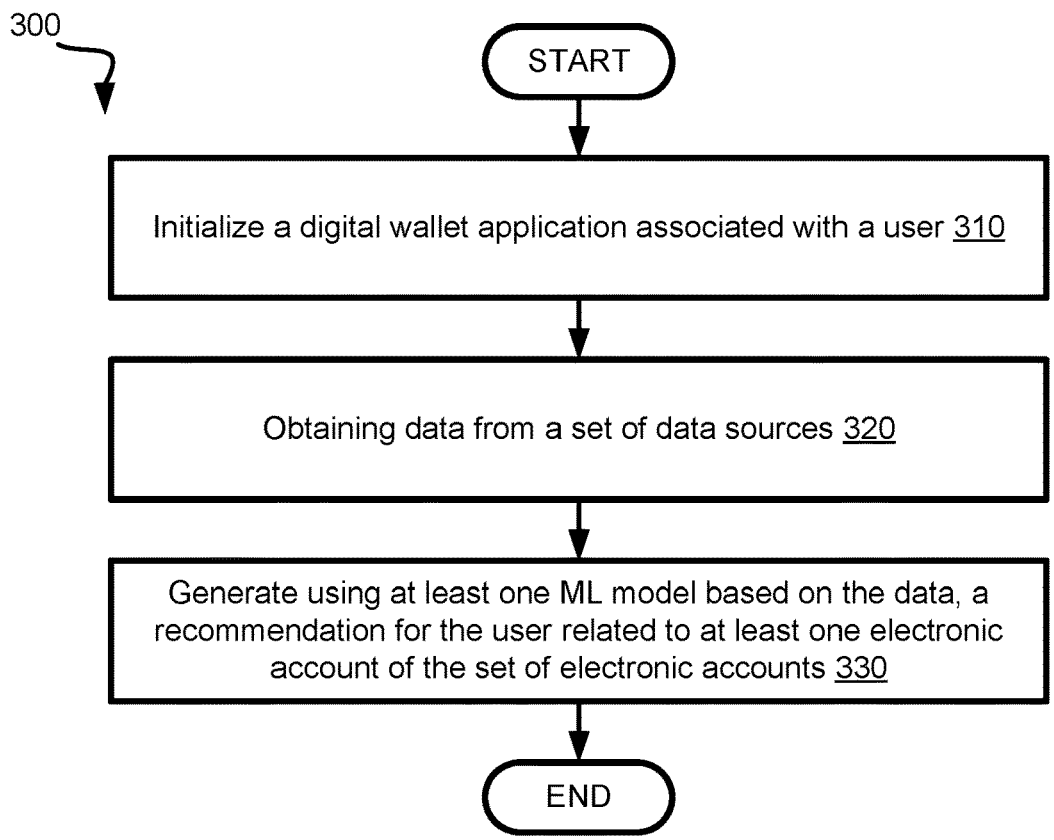
FIGS. 3-5 are flow diagrams of example methods to implement digital wallet applications supporting decentralized web integration, in accordance with some implementations of the present disclosure.

FIG. 3 is a flow diagram of example method 300 to implement digital wallet applications supporting decentralized web integration, in accordance with some implementations of the present disclosure.

In reference to FIG. 3, the method 300 may include initializing a digital wallet application associated with a user (block 310). The digital wallet application may be integrated with at least one decentralized web technology and hosted on a digital wallet platform, and the digital wallet application may implement a digital wallet linked to a set of electronic accounts. The method 300 may further include obtaining data from a set of data sources (block 320). The method 300 may further include generating, using at least one ML model based on the data, a recommendation for the user related to at least one electronic account of the set of electronic accounts (block 330).

In certain embodiments, the instructions, the method 300 may further include: training the at least one ML model with a set of training data from the set of data sources to generate a set of training recommendations as outputs, wherein each training recommendation in the set of training recommendations is related to an electronic account of the set of electronic accounts.

In some embodiments, a first data source of the set of data sources is a campaign corresponding to a first electronic account of the set of electronic accounts, and the method 300 may further include: verifying that the first data source satisfies a security threshold; responsive to determining that the first data source fails to satisfy the security threshold, blocking data transmission from the first data source; responsive to determining that the first data source satisfies the security threshold, obtaining a first data set from the first data source; and applying the at least one ML model to user post language and security compliance data from the first data set to generate the recommendation for the user.

In certain embodiments, the method 300 may further include: receiving user input corresponding to at least one electronic account; analyzing, by at least one ML model, the user input and a data set from one or more electronic accounts that are different from the at least one electronic account; generating, by at least one ML model based on the user input, a subsequent recommendation indicating a predicted impact the user input has on the at least one electronic account of the one or more electronic accounts that are different from the at least one electronic account; and causing a user interface to display the subsequent recommendation for analysis by the user.

In some embodiments, the method 300 may include: aggregating security data from one or more data sources that are external to the digital wallet application, the aggregated security data being associated with one or more electronic accounts of the set of electronic accounts; updating a set of security data that is stored as part of the digital wallet application based on the aggregated security data; generating, by at least one ML model, (i) an interference prediction based on the data from the set of data sources and the updated set of security data and (ii) a security recommendation for the user based on the interference prediction, wherein the interference prediction indicates at least one of the one or more electronic accounts represented in the aggregated security data; and causing a user interface to display the interference prediction and the security recommendation for analysis by the user. Further in these embodiments the method 300 may include: receiving, from the user, an input related to the security recommendation; and modifying a security operation of the at least one of the one or more electronic accounts represented in the aggregated security data based on the user input.

In certain embodiments, the method 300 may further include: aggregating security data from one or more data sources that are external to the digital wallet application, the aggregated security data being associated with one or more electronic accounts of the set of electronic accounts; updating a set of security data that is stored as part of the digital wallet application based on the aggregated security data; generating, by at least one ML model, a security recommendation for the user based on the updated set of security data, wherein the security recommendation indicates at least one of the one or more electronic accounts represented in the aggregated security data; causing a user interface to display the security recommendation for analysis by the user; receiving, from the user, an input related to the security recommendation; and modifying a security operation of the at least one of the one or more electronic accounts represented in the aggregated security data based on the user input.

In some embodiments, the method 300 may further include: constructing, by the at least one ML model based on historical user data stored as part of the digital wallet application, an action pattern of the user; generating, by at least one ML model based on the action pattern, a set of predicted action patterns of the user; organizing the set of predicted action patterns into a ranked list based on one or more criteria; and modifying subsequent outputs of the digital wallet application in accordance with the ranked list.

In certain embodiments, the method 300 may further included: constructing, by at least one ML model based on historical user data stored as part of the digital wallet application, an action pattern of the user; generating, by at least one ML model based on the action pattern, (i) a short-term recommendation for the user, (ii) a medium-term recommendation for the user, and (iii) a long-term recommendation for the user, wherein each recommendation is associated with one or more of the set of electronic accounts; and modifying subsequent outputs of the digital wallet application in accordance with the short-term recommendation, the medium-term recommendation, and the long-term recommendation.

In some embodiments, the digital wallet is hosted on a distributed ledger platform with access to a distributed ledger and each transaction input by the user is recorded on the distributed ledger, and the method 300 further includes: receiving a transaction listing from the user corresponding to one or more of the set of electronic accounts, the transaction listing including (i) user data corresponding to the user and (ii) an updated state of an asset related to the one or more of the set of electronic accounts; generating a transaction including a description of the transaction listing; and recording the transaction in the distributed ledger. Further in these embodiments, the method 300 may include: responsive to recording the transaction in the distributed ledger, updating a virtual, three-dimensional representation of the asset based on the updated state of the asset.

In certain embodiments, the method 300 may further include: aggregating historical user data for one or more users accessing the digital wallet platform; constructing, by at least one ML model based on historical user data stored as part of the digital wallet application and the aggregated historical user data, a group action pattern of the user and other users indicated in the aggregated historical user data that are substantially similar to the user based on one or more similarity metrics; generating, by at least one ML model based the group action pattern, the recommendation for the user; and modifying subsequent outputs of the digital wallet application in accordance with the recommendation.

In some embodiments, the method 300 may further include: generating, by at least one ML model based on (i) a set of virtual assets of the user and (ii) a set of real assets of the user, an allocation recommendation; receiving a user input from the user corresponding to the allocation recommendation; adjusting an allocation of the set of virtual assets of the user or the set of real assets of the user based on the user input; and updating the at least one ML model in accordance with the user input.

Figure 4:
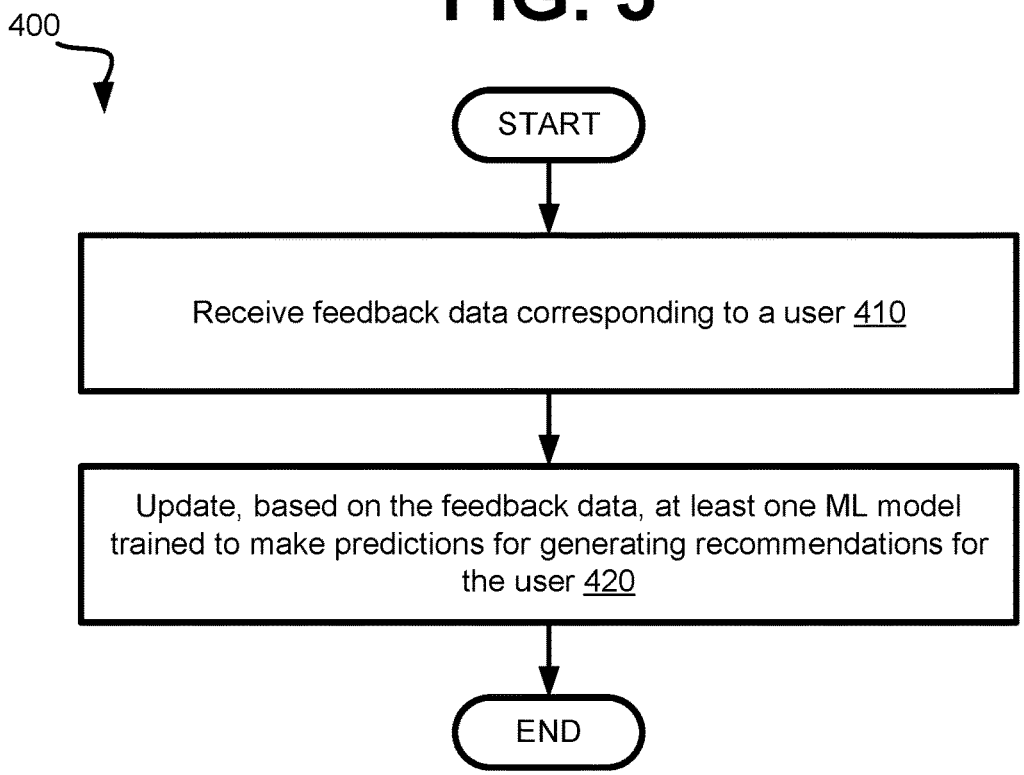

FIG. 4 is a flow diagram of example method 400 to implement digital wallet applications supporting decentralized web integration, in accordance with some implementations of the present disclosure. The example method 400 in FIG. 4 includes receiving feedback data corresponding to a user (block 410). The method 400 further includes updating, based on the feedback data, at least one ML model trained to make predictions for generating recommendations for the user (block 420). For example, a ML model of the digital wallet application system 120 may output a recommendation indicating that a user may benefit from re-allocating a portion of the user's real-world currency into a corresponding portion of virtual currency. In accordance with the recommendation, the user may perform actions to transfer the portion of the user's real-world currency into virtual currency, and over a first period of time, the virtual currency may lose significantly more value than the real-world currency. Thus, the user may lose value associated with the virtual currency that would not have occurred if the user did not adopt the recommendation from the ML model, and the user may provide feedback to the digital wallet application system 120 corresponding to the drop in value. The system 120 may analyze this feedback and update, re-train, and/or otherwise adjust the ML model(s) in accordance with the user's feedback to cause the ML model(s) to provide better predictions/recommendations in the future when similar circumstances are present.

Figure 5:
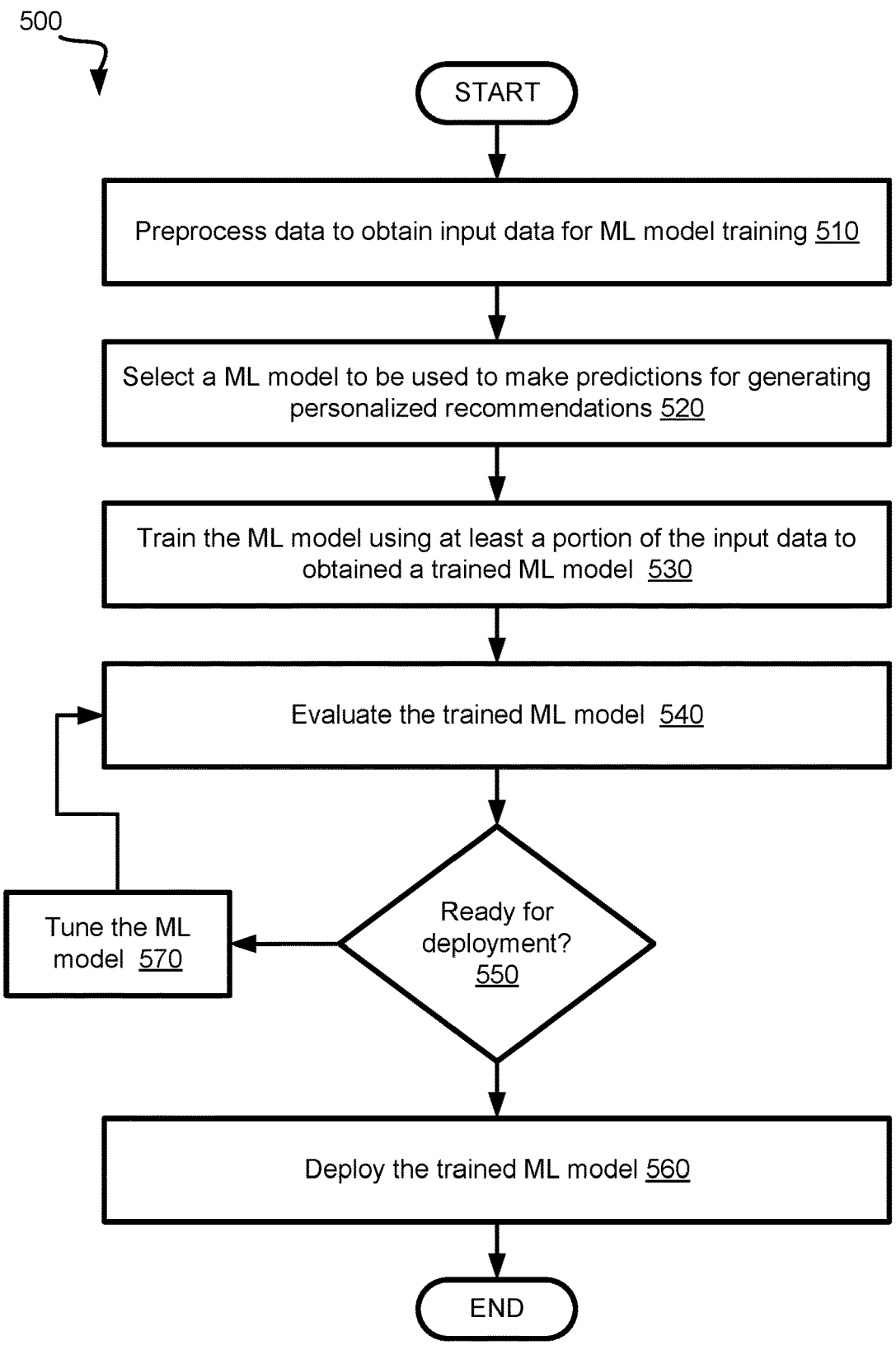

FIG. 5 is a flow diagram of example method 500 to implement digital wallet applications supporting decentralized web integration, in accordance with some implementations of the present disclosure. The example method 500 of FIG. 5 may include preprocessing data to obtain input data for ML model training (block 510). The example method 500 may further include selecting a ML model to be used to make predictions for generating personalized recommendations (block 520). The example method 500 may further include training the ML model using at least a portion of the input data to obtain a trained ML model (block 530).

The example method 500 may further include evaluating the trained ML model (block 540) to determine whether the ML model is ready for deployment (block 550). If the ML model does not satisfy accuracy/precision thresholds and/or is otherwise not ready for deployment (NO branch of block 550), then the example method 500 may further include tuning the ML model (block 570). For example, the ML model may provide outputs indicating that a first parameter is currently set too high, too low, and/or otherwise improperly set, such that the tuning at block 570 may include adjusting the first parameter to a more appropriate setting to cause the ML model to generate more appropriately tuned outputs.

Figure 6:
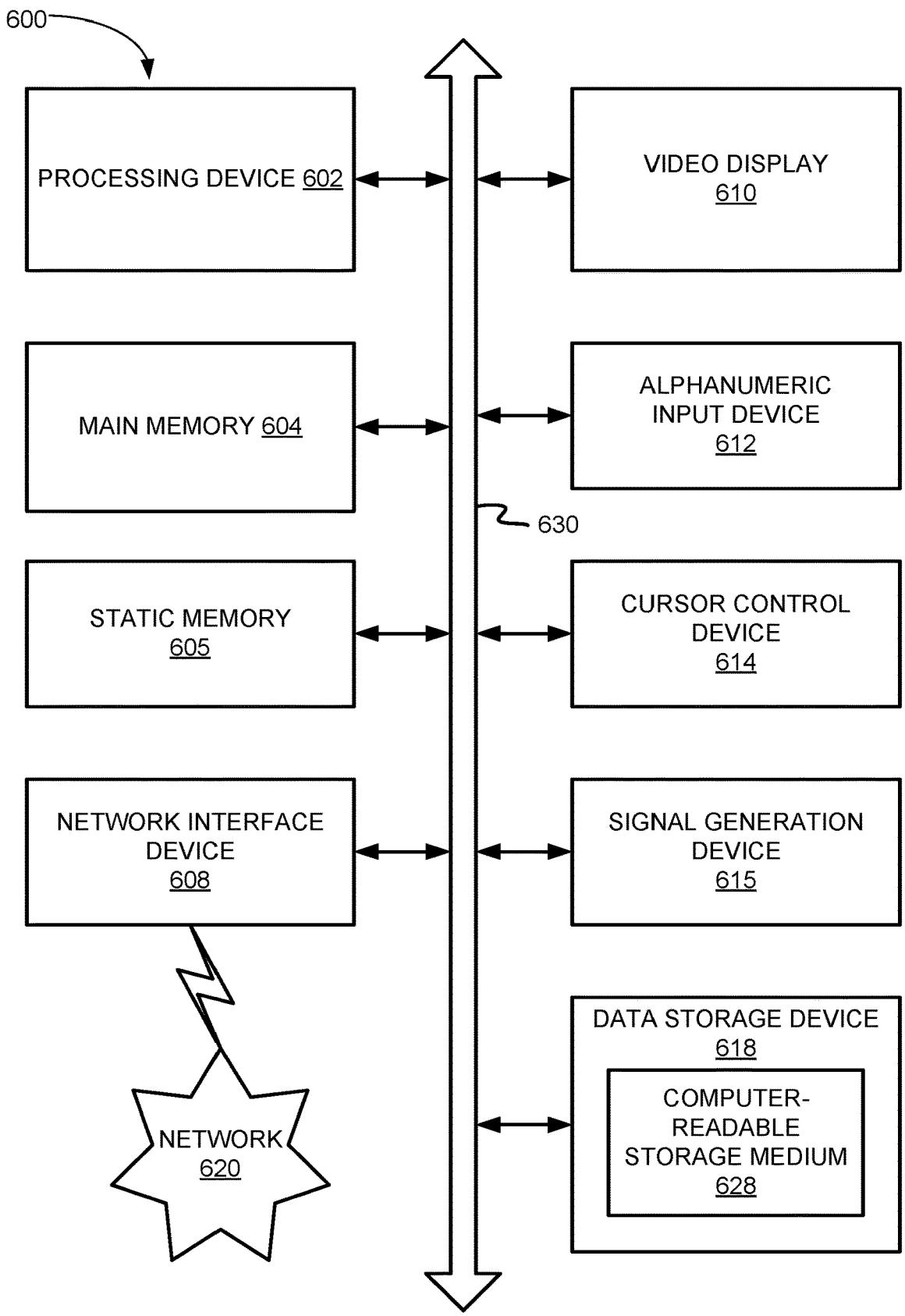
FIG. 6 is a block diagram of an example computer system in which implementations of the present disclosure may operate.

If the ML model does satisfy the accuracy/precision thresholds and/or is otherwise ready for deployment (YES branch of block 550), then the example method 500 may further include deploying the ML model (block 560). For example, when the ML model generates outputs once or consistently that satisfy each/all applicable accuracy thresholds, then the ML model may be deployed for real-time analysis of user inputs and/or other suitable inputs as part of the digital wallet application system 120 (e.g., as part of the ML model(s) 143). FIG. 6 is a block diagram of an example computer system 600 in which implementations of the present disclosure may operate. Generally, the example computer system 600 may include one or more processing devices 602, a main memory 604, a static memory 605, a network interface device 608, a video display 610, an alphanumeric input device 612, a cursor control device 614, a signal generation device 615, and a data storage device 618 with a computer-readable storage medium 628. The example computer system 600 may also be connected to a network 620 via the network interface device 608, and each of the components of the example computer system 600 may be communicatively coupled to one another via a communication coupling 630 (e.g., computing bus protocols, etc.).

Broadly, the example computer system 600 may be or include any of the devices or components of such devices, as described herein. For example, the example computer system 600 may be a client device (e.g., client device 154) and/or may be or include any device that is associated with (e.g., configured to connect with, etc.) a particular user, who may connect to and/or otherwise provide data that may be transmitted to the example computer system 600 through the network 620. In certain embodiments, the example computer system 600 may be a personal computing device of that user, such as a smartphone, a tablet, smart glasses, or any other suitable device or combination of devices (e.g., a smart watch plus a smartphone) with wireless communication capability.

The example computer system 600 may also be communicatively coupled to any of the devices and/or components described herein, such as the digital wallet application system 120, the data storage system 135, and/or the data sources 110. For example, the example computer system 600 and the devices and components thereof described herein may communicate via USB, Bluetooth, Wi-Fi Direct, NFC, etc. For example, the digital wallet application system 120 may transmit a recommendation, and/or any other values, responses, or combinations thereof to the example computer system 600 via the network interface device 608.

The processing device 602 may be or include any suitable number of processors and/or processor types. For example, the processing device 602 may include one or more CPUs and one or more graphics processing units (GPUs). Generally, the processing device 602 may be configured to execute software instructions stored in the main memory 604 and/or the static memory 605. The main memory 604 and/or the static memory 605 may include one or more persistent memories (e.g., a hard drive and/or solid-state memory) and may store one or more applications, modules, and/or models, such as the digital wallet application system 120 and/or the ML model(s) 143.

The network interface device 608 may enable the example computer system 600 to communicate with any external devices across the network 620, as described herein. More specifically, the network interface device 608 enables the example computer system 600 to communicate with any suitable component described herein across the network 620 through the respective device networking interfaces. The network interface device 608 may support wired or wireless communications, such as USB, Bluetooth, Wi-Fi Direct, NFC, etc. The network interface device 608 may enable the example computer system 600 to communicate with the various components described herein via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc.

Moreover, the network 620 may be a single communication network, or may include multiple communication networks of one or more types (e.g., one or more wired and/or wireless personal or local area networks (PANs or LANs), and/or one or more wide area networks (WANs) such as the Internet). In some embodiments, the network 620 includes multiple, entirely distinct networks (e.g., one or more networks for communications between the example computer system 600 and a first connected device, and a separate, Bluetooth or wireless LAN (WLAN) network for communications between the example computer system 600 and a second connected device, and so on).

The video display 610 may be a display configured to visually and/or otherwise display information output by the processing device 602 and/or otherwise received across the network 620 to a user of the example computer system 600. For example, the video display 610 may be a user interface where recommendations from the ML models described herein may be displayed to the user for analysis. The user may also interact with and/or based on such outputs from the ML models by using the video display 610 (e.g., a touchscreen and/or similar peripheral(s)), the alphanumeric input device 612 (e.g., a keyboard and/or similar peripheral(s)), the cursor control device 614 (e.g., a mouse and/or similar peripheral(s)), the signal generation device 615 (e.g., a microphone, a speaker, a light (e.g., light emitting diode (LED)), a haptic feedback generator, and/or similar peripheral(s)), and/or any other components or combinations thereof.

Figure 7:
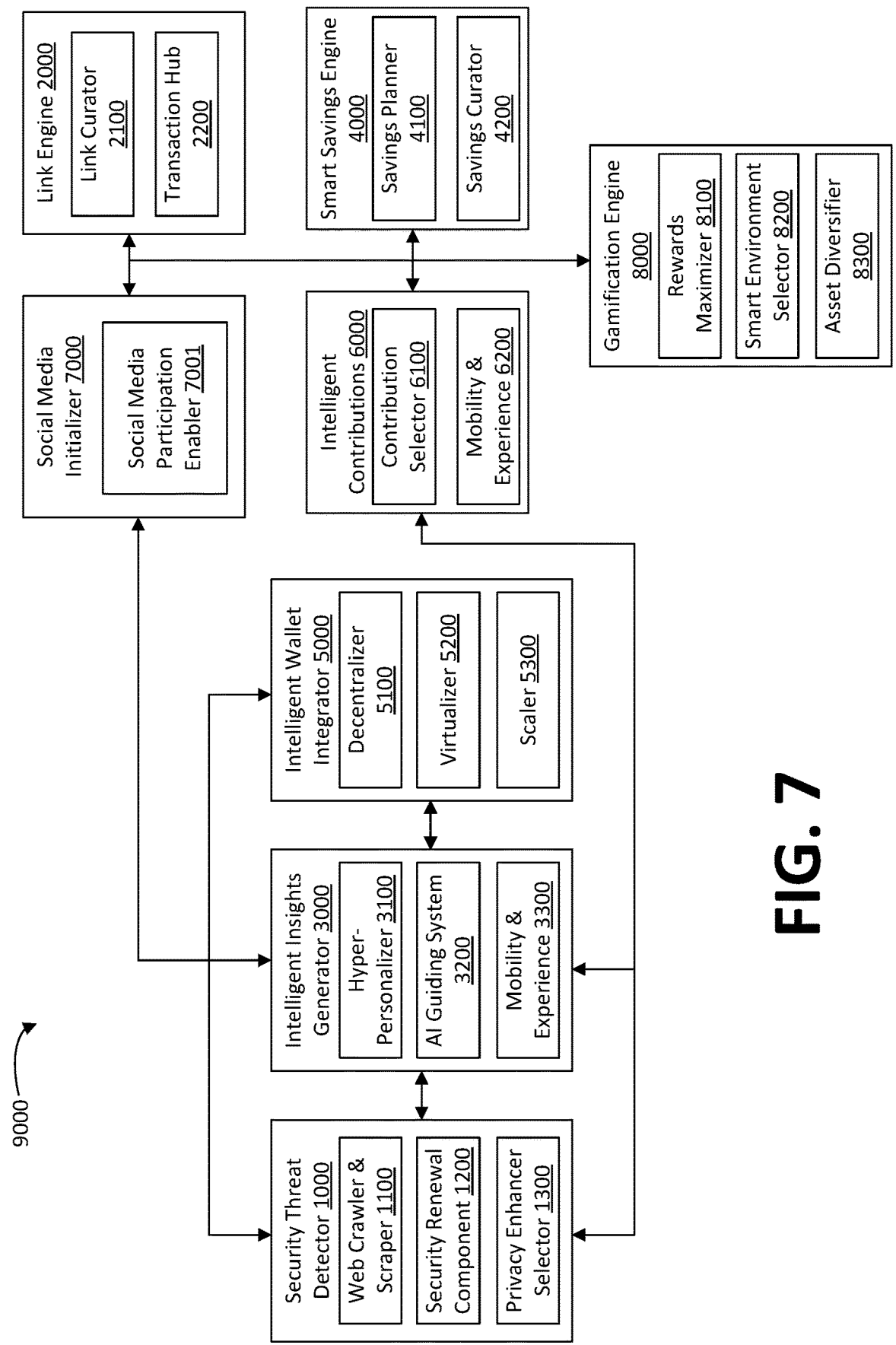
FIG. 7 is a block diagram of another exemplary computing system in which the techniques of the present disclosure may be implemented, in accordance with various embodiments disclosed herein.

FIG. 7 is a block diagram of another exemplary computing system 9000 in which the techniques of the present disclosure may be implemented, in accordance with various embodiments disclosed herein. One or more of the components of the exemplary computing system 9000 may be similar/identical to one or more of the components of the other computing systems disclosed herein. For example, the gamification engine 8000 may be similar/identical to the gamification engine 147 of FIG. 1C.

As shown, the exemplary computing system 9000 can include social media initializer 7000 and link engine 2000. Social media initializer 7000 and link engine 2000 can enable connections with various campaigns. For instance, a user may drive on a highway and may see a banner with a QR code promoting retirement information. By scanning the QR code, the user may initiate engagement with the campaign. As another example, when a user enters a mall and approaches a retirement information booth, a digital wallet application (e.g., digital wallet application system 120), installed on a user device (e.g., mobile device), can utilize at least one of NFC, Bluetooth, etc. to initiate participation with a campaign. With respect to XR, a digital wallet application can use APIs to trigger participation in a campaign when a digital avatar of a user enters a designated location within the virtual environment.

Link curator 2100 can employ ML models to determine whether a campaign is legitimate and/or to customize a campaign to a particular user (e.g., based on personal preferences of the user). This customization ensures that campaigns are intuitive, easy to understand, and user-friendly.

Transaction hub 2200 can verify the security of technologies such as APIs, QR codes, NFCs, Bluetooth, Wi-Fi, etc. to ensure compliance with all regulations, policies, and expectations and ensure secure by default is achieved. Transaction hub 2200 can employ ML models to assess the importance of potentially sensitive language for a user and ensure that compliance details are met. For example, ML models can analyze user post behaviors as input to predict how a specific campaign will impact their retirement and compare expected benefits with similar participants. Transaction hub 2200 ensures a secure link and assesses the campaign s benefits to a user, taking into account past campaigns and highlighting how this campaign may be better or supplement past efforts towards a successful retirement.

A digital wallet can support integration with a number of different types of campaigns. More specifically, a digital wallet application can use plug-and-play features to enable integration, allowing users to easily participate in campaigns, contribute to retirement accounts, earn rewards, etc. without having to navigate through complicated processes. For example, the social media participation enabler 7001 may enable users to participate in campaigns using barcodes (e.g., QR codes). Examples of campaigns include campaigns accessible via social media platforms ("social media campaigns"), campaigns accessible via non-digital channels, and campaigns accessible via partner programs ("partner program campaigns"). Examples of non-digital channels include billboards, print advertisements, direct mail, etc. Examples of partner programs include rewards programs, loyalty programs, affiliate programs, etc. For example, a digital wallet application can allow users to participate in partner programs (e.g., through the use of a QR code). A digital wallet application can provide real-time or near real-time feedback and intelligent scenarios on how contributions to a digital wallet are impacting savings, rewards earned through partner programs, etc.

Link engine 2000 can be used to link a digital wallet to other electronic accounts (e.g., digital wallets, electronic credit card accounts, electronic bank accounts, electronic investment accounts) via a variety of technologies like APIs, QR codes, NFC, etc. For example, a digital wallet application can provide an "all-in-one" feature to allow users to view data across all of the linked accounts (e.g., transaction data) in a dashboard displayed by the digital wallet application.

As another example, a digital wallet application can allow users to link reward points from different electronic loyalty programs, such as credit card reward programs, airline loyalty programs, hotel loyalty programs, etc. For example, a digital wallet application can enable a user to view rewards balances and can enable redemption using the digital wallet application.

As yet another example, a digital wallet application can allow users to send and receive money directly from other digital wallet application and/or P2P payment applications. This can allow a user to initiate a transaction within the digital wallet application, eliminating the need for the user to log into each individual application and/or switch between individual applications.

The exemplary computing system 9000 can further include security threat detector 1000, intelligent insights generator 3000, and intelligent wallet integrator 5000.

Security threat detector 1000 can include ensure cybersecurity and has privacy-enhancing policies, regulations, and compliance measures integrated by default, with continuous updates to address emerging risks. Security threat detector 1000 can enable the digital wallet application to meet or exceeds privacy regulations by intelligently detecting and assessing security requirements based on various factors such as regulations, policies, risks, and compliance standards. The detection can be an automated process and can consider all the relevant factors to ensure that the digital wallet application meets or exceeds the necessary security standards. The digital wallet application will be proactively updated to stay compliant with the latest and foreseen security requirements, ensuring that user data is always protected. The intelligent AI driven detection will help prevent security breaches and ensure the system is secure by default. For example, security threat detector 1000 can use ML models to continuously search the web for information related to regulations, policies, risks, and compliance, ensuring that our data is up-to-date. Web crawler & scraper 1100 can be used to determine that this information is continuously integrated and updated. Security renewal component 1200 can provide continuous analysis and guidance on security, threats and/or cybersecurity technologies. For example, security renewal component 1200 can use ML models to detect and predict any potential interference that a campaign might have with participant security, compliance, and benefits impact. Privacy enhancer selector 1300 can incorporate MFA (e.g., 2FA), multi-sig technology, ZKPs, decentralized protocols, etc. to continuously enhance privacy while mitigating security threats.

Intelligent insights generator 3000 can generate personalized and customized insights for users that can be used to create user experiences. Intelligent insights generator 3000 can enable continuous tracking and provide guidance to a user through visualizations, written statements, audio statements, etc. using ML models and technology such as generative models (e.g., LLM models), NLP (e.g., speech-to-text technology and/or text-to-speech technology) etc. Intelligent insights generator 3000 can generate behavior patterns ("patterns") for a user based on the users priorities and goals and compare these patterns with similar users or cohorts to improve decision-making and suggestions for next best actions. For example, hyper-personalizer 3100 can use ML models to provide personalized and customized information to users, creating guided experiences and ensuring accessibility in any real or virtual environment. Hyper-personalizer 3100 can also predict future patterns and rank them according to benefits, security, safety, compliance, risk, and participant desire and aspirations. AI guiding system 3200 can leverage ML models such as classification models, regression models, generative models, NLP, etc. to deliver real-time guiding solutions and an intuitive experience. For example, AI guiding system 3200 can match patterns and generate a set of actions (e.g., short, medium, and/or long-term actions) for a user to consider to make a more informed decision. Mobility and Experience component 3300 can enable the use of the digital wallet application on multiple platforms or form factors such as mobile devices, tables, desktops, laptops, XR platforms, etc. For example, Mobility and Experience component 3300 can use ML models to ensure that information is made available and ready to be accessed by a user on any device and in any environment.

Intelligent wallet integrator 5000 can utilize technologies to enable seamless integration with any environment, including virtual environments such as the metaverse, while also ensuring scalability. For example, intelligent wallet integrator 5000 can utilize blockchain technologies, such as smart contracts and NFTs. Decentralizer 5100 can enable integration with blockchain technologies, such as smart contracts, digital assets (e.g., cryptocurrencies, NFTs) DeFi protocols, etc. A digital wallet can be housed on a blockchain platform and can use smart contract technology to provide a secure, decentralized, and transparent way to manage digital assets. Accordingly, a digital wallet application can store and manage a variety of digital assets across various blockchain systems in one place.

Visualizer 5200 can enable integration with XR platforms to allow users to move their experiences from the real world into the virtual world and vice versa. For example, a digital wallet application can allow a user to store and manage virtual assets, such as virtual land, digital collectibles, and other digital assets, in one place. A digital wallet application can also enable a user to perform virtual asset transactions within a virtual environment.

Scaler 5300 can be used to ensure that technologies required to connect multi-blockchain, multi-digital wallet, and multi-environment seamlessly are available to integrate with each other and can scale from one environment to another with ease. Intelligent wallet integrator 5000 can receive data from intelligent insights generator 3000. Intelligent insights generator 3000 can use ML models to generate predictions, rankings, and classifications, as well as recommendations to enhance technological capabilities.

A digital wallet application can support multiple blockchains and digital platforms, which can enable a user to transfer a digital or virtual assets between different blockchain platforms and/or digital platforms without having to use multiple digital wallets. A digital wallet application can use ML models to provide personalized recommendations with respect to optimal asset management across multiple different platforms.

The exemplary computing system 9000 can further include intelligent contributions component 6000 and smart savings engine 4000. Intelligent contributions component 6000 can include contribution selector 6100 and mobility and experience component 6200. Intelligent contributions component 6000 can make use of the data gathered from the intelligent insights generator 3000 and security threat detector 1000 to ensure that a user is provided with the next best actions based on detected factors of the experience and proactive insights and security. These factors include a type of campaign that triggered the interaction, the users history, preferences, and behavior, as well as the type of interaction, environment, and technology mobility. Intelligent contributions component 6000 can use this data to determine the most relevant and effective actions to take by the participant, given the participants unique circumstances, experience, behavior, etc.

Smart savings engine 4000 can include savings planner 4100 and savings curator 4200. Savings planner 4100 can utilize ML models, such as a set of ensemble models, to classify, rank, and/or predict behavior changes, and recommend specific savings types and benefits based on the user's unique characteristics, including retirement expectations, goals, cost of living, and other known patterns (i.e., family features, community features, location features, etc.). These patterns can also be derived from either historical participant behaviors or similar participants and their group patterns. Savings curator 4200 can identify the most relevant and effective campaigns based on the savings plan or insights. For example, savings curator 4200 can use ML models to classify campaigns, compare their benefits, and provide recommendations to a user on how to make more informed decisions.

The exemplary computing system 9000 can further include gamification engine 8000. For example, gamification engine 8000 can include rewards maximizer 8100, smart environment selector 8200, and asset diversifier 8300. Rewards maximizer 8100 can utilize ML models to provide a user with better insights and assist them in making better decisions. By comparing and assessing the user's income types in both virtual and real currencies, ML models can be used to generate predictions on which environment and currency the user should focus on to maximize their benefits in the short, medium, and long term. Rewards maximizer 8100 can also provide independent opportunities to maximize virtual currencies within the gamification environment. Smart environment selector 8200 can continuously gather relevant information from various public sources, such as portals, blogs, and news, and use ML models to generate patterns that enhance rewards maximizer 8100 and maximize rewards and expedite conversion from virtual to real currencies and vice versa. Asset diversifier 8300 can further enhance gamification engine 8000 by looking into all existing market options, such as portfolios, contribution systems, electronic accounts, etc. and classifying and ranking them based on the benefit opportunities. Based on the user's features, expectations, and goals, as well as recommendations from similar participants and cohorts, the asset diversifier 8300 can recommend the best match for the participant.

A digital wallet application with gamification capabilities can incentivize and reinforce retirement contributions in social media and/or virtual environment communities. For example, a user can earn virtual and tangible rewards, such as badges, levels, and virtual/real currency, for making retirement contributions. A user can share progress and/or achievements with peers within social media and/or virtual environment communities.

A digital wallet application can use gamification to teach users about retirement investing and incentivize users to make contributions. For example, a digital wallet application can enable a user to create a virtual retirement account for investing virtual currency in a variety of virtual retirement assets. The user can earn virtual rewards for making contributions, diversifying their portfolios, and achieving their retirement goals. The digital wallet application can also enable the user to compete and collaborate with their peers.

A digital wallet application can use gamification to help users plan and achieve their retirement goals in virtual environment communities. For example, a digital wallet application can enable a user to create virtual retirement accounts and invest virtual currency in a variety of virtual assets within a virtual environment, such as virtual real estate, digital collectibles, etc. The user can earn virtual rewards for making contributions, diversifying their portfolios, and achieving their retirement goals. A digital wallet application can provide the user with personalized insights and recommendations on how to optimize retirement contributions and maximize their rewards in the virtual environment.

It will be understood that the above disclosure is one example and does not necessarily describe every possible embodiment. As such, it will be further understood that alternate embodiments may include fewer, alternate, and/or additional steps or elements.

What is claimed is:

1. A system comprising:
   one or more processors; and
   a non-transitory computer-readable memory coupled to the one or more processors, the memory storing instructions thereon that, when executed by the one or more processors, cause the one or more processors to:
   initialize a digital wallet application associated with a user, wherein the digital wallet application is integrated with at least one decentralized web technology and hosted on a digital wallet platform, and wherein the digital wallet application implements a digital wallet linked to a set of electronic accounts;
   obtain data from a set of data sources; and
   generate, using at least one machine learning (ML) model based on the data, a recommendation for the user related to at least one electronic account of the set of electronic accounts.

2. The system of claim 1, wherein the instructions, when executed by the one or more processors, further cause the one or more processors to:
   train the at least one ML model with a set of training data from the set of data sources to generate a set of training recommendations as outputs, wherein each training recommendation in the set of training recommendations is related to an electronic account of the set of electronic accounts.

3. The system of claim 1, wherein a first data source of the set of data sources is a campaign corresponding to a first electronic account of the set of electronic accounts, and wherein the instructions, when executed by the one or more processors, further cause the one or more processors to:
   verify that the first data source satisfies a security threshold;
   responsive to determining that the first data source fails to satisfy the security threshold, block data transmission from the first data source;
   responsive to determining that the first data source satisfies the security threshold, obtain a first data set from the first data source; and
   apply the at least one ML model to user post language and security compliance data from the first data set to generate the recommendation for the user.

4. The system of claim 1, wherein the instructions, when executed by the one or more processors, further cause the one or more processors to:
   receive user input corresponding to at least one electronic account;
   analyze, by the at least one ML model, the user input and a data set from one or more electronic accounts that are different from the at least one electronic account;
   generate, by the at least one ML model based on the user input, a subsequent recommendation indicating a predicted impact the user input has on the at least one electronic account of the one or more electronic accounts that are different from the at least one electronic account; and
   cause a user interface to display the subsequent recommendation for analysis by the user.

5. The system of claim 1, wherein the instructions, when executed by the one or more processors, further cause the one or more processors to:
   aggregate security data from one or more data sources that are external to the digital wallet application, the aggregated security data being associated with one or more electronic accounts of the set of electronic accounts;
   update a set of security data that is stored as part of the digital wallet application based on the aggregated security data;
   generate, by the at least one ML model, (i) an interference prediction based on the data from the set of data sources and the updated set of security data and (ii) a security recommendation for the user based on the interference prediction, wherein the interference prediction indicates at least one of the one or more electronic accounts represented in the aggregated security data; and
   cause a user interface to display the interference prediction and the security recommendation for analysis by the user.

6. The system of claim 5, wherein the instructions, when executed by the one or more processors, further cause the one or more processors to:
   receive, from the user, an input related to the security recommendation; and
   modify a security operation of the at least one of the one or more electronic accounts represented in the aggregated security data based on the user input.

7. The system of claim 1, wherein the instructions, when executed by the one or more processors, further cause the one or more processors to:

aggregate security data from one or more data sources that are external to the digital wallet application, the aggregated security data being associated with one or more electronic accounts of the set of electronic accounts;
update a set of security data that is stored as part of the digital wallet application based on the aggregated security data;
generate, by the at least one ML model, a security recommendation for the user based on the updated set of security data, wherein the security recommendation indicates at least one of the one or more electronic accounts represented in the aggregated security data;
cause a user interface to display the security recommendation for analysis by the user;
receive, from the user, an input related to the security recommendation; and
modify a security operation of the at least one of the one or more electronic accounts represented in the aggregated security data based on the user input.

8. The system of claim 1, wherein the instructions, when executed by the one or more processors, further cause the one or more processors to:
construct, by the at least one ML model based on historical user data stored as part of the digital wallet application, an action pattern of the user;
generate, by the at least one ML model based on the action pattern, a set of predicted action patterns of the user;
organize the set of predicted action patterns into a ranked list based on one or more criteria; and
modify subsequent outputs of the digital wallet application in accordance with the ranked list.

9. The system of claim 1, wherein the instructions, when executed by the one or more processors, further cause the one or more processors to:
construct, by the at least one ML model based on historical user data stored as part of the digital wallet application, an action pattern of the user;
generate, by the at least one ML model based on the action pattern, (i) a short-term recommendation for the user, (ii) a medium-term recommendation for the user, and (iii) a long-term recommendation for the user, wherein each recommendation is associated with one or more of the set of electronic accounts; and
modify subsequent outputs of the digital wallet application in accordance with the short- term recommendation, the medium-term recommendation, and the long-term recommendation.

10. The system of claim 1, wherein the digital wallet is hosted on a distributed ledger platform with access to a distributed ledger and each transaction input by the user is recorded on the distributed ledger, and wherein the instructions, when executed by the one or more processors, further cause the one or more processors to:
receive a transaction listing from the user corresponding to one or more of the set of electronic accounts, the transaction listing including (i) user data corresponding to the user and (ii) an updated state of an asset related to the one or more of the set of electronic accounts;
generate a transaction including a description of the transaction listing; and
record the transaction in the distributed ledger.

11. The system of claim 10, wherein the instructions, when executed by the one or more processors, further cause the one or more processors to:
responsive to recording the transaction in the distributed ledger, update a virtual, three-dimensional representation of the asset based on the updated state of the asset.

12. The system of claim 1, wherein the instructions, when executed by the one or more processors, further cause the one or more processors to:
aggregate historical user data for one or more users accessing the digital wallet platform;
construct, by the at least one ML model based on historical user data stored as part of the digital wallet application and the aggregated historical user data, a group action pattern of the user and other users indicated in the aggregated historical user data that are substantially similar to the user based on one or more similarity metrics;
generate, by the at least one ML model based the group action pattern, the recommendation for the user; and
modify subsequent outputs of the digital wallet application in accordance with the recommendation.

13. The system of claim 1, wherein the instructions, when executed by the one or more processors, further cause the one or more processors to:
generate, by the at least one ML model based on (i) a set of virtual assets of the user and (ii) a set of real assets of the user, an allocation recommendation;
receive a user input from the user corresponding to the allocation recommendation;
adjust an allocation of the set of virtual assets of the user or the set of real assets of the user based on the user input; and
update the at least one ML model in accordance with the user input.

14. A method comprising:
initializing, by one or more processors, a digital wallet application associated with a user, wherein the digital wallet application is integrated with at least one decentralized web technology, and wherein the digital wallet application implements a digital wallet linked to a set of electronic accounts;
obtaining, by the one or more processors, data from a set of data sources; and
generating, by the one or more processors using at least one machine learning (ML) model based on the data, a recommendation for the user related to at least one electronic account of the set of electronic accounts.

15. The method of claim 14, further comprising:
training, by the one or more processors, the at least one ML model with a set of training data from the set of data sources to generate a set of training recommendations as outputs, wherein each training recommendation in the set of training recommendations is related to an electronic account of the set of electronic accounts.

16. The method of claim 14, wherein a first data source of the set of data sources is a campaign corresponding to a first electronic account of the set of electronic accounts, and the method further comprises:
verifying, by the one or more processors, that the first data source satisfies a security threshold;
responsive to determining that the first data source fails to satisfy the security threshold, blocking, by the one or more processors, data transmission from the first data source;
responsive to determining that the first data source satisfies the security threshold, obtaining, by the one or more processors, a first data set from the first data source; and applying, by the one or more processors, the at least one ML model to user post language and security compliance data from the first data set to generate the recommendation for the user.

17. The method of claim 14, further comprising:
aggregating, by the one or more processors, security data from one or more data sources that are external to the digital wallet application, the aggregated security data being associated with one or more electronic accounts of the set of electronic accounts;
updating, by the one or more processors, a set of security data that is stored as part of the digital wallet application based on the aggregated security data;
generating, by the at least one ML model, a security recommendation for the user based on the updated set of security data, wherein the security recommendation indicates at least one of the one or more electronic accounts represented in the aggregated security data;
causing, by the one or more processors, a user interface to display the security recommendation for analysis by the user;
receiving, from the user, an input related to the security recommendation; and
modifying, by the one or more processors, a security operation of the at least one of the one or more electronic accounts represented in the aggregated security data based on the user input.

18. The method of claim 14, further comprising:
constructing, by the at least one ML model based on historical user data stored as part of the digital wallet application, an action pattern of the user;
generating, by the at least one ML model based on the action pattern, a set of predicted action patterns of the user;
organizing, by the one or more processors, the set of predicted action patterns into a ranked list based on one or more criteria; and
modifying, by the one or more processors, subsequent outputs of the digital wallet application in accordance with the ranked list.

19. The method of claim 14, wherein the digital wallet is hosted on a distributed ledger platform with access to a distributed ledger and each transaction input by the user is recorded on the distributed ledger, and the method further comprises:
receiving, by the one or more processors, a transaction listing from the user corresponding to one or more of the set of electronic accounts, the transaction listing including (i) user data corresponding to the user and (ii) an updated state of an asset related to the one or more of the set of electronic accounts;
generating, by the one or more processors, a transaction including a description of the transaction listing; and
recording, by the one or more processors, the transaction in the distributed ledger.

20. A non-transitory computer-readable storage medium having instructions stored thereon that, when executed by one or more processors, cause the one or more processors to:
initialize a digital wallet application associated with a user, wherein the digital wallet application is integrated with at least one decentralized web technology, and wherein the digital wallet application implements a digital wallet linked to a set of electronic accounts;
obtain data from a set of data sources; and
generate, using at least one machine learning (ML) model based on the data, a recommendation for the user related to at least one electronic account of the set of electronic accounts.

* * * * *